United States Patent
Sarwat et al.

(10) Patent No.: US 12,470,072 B1
(45) Date of Patent: Nov. 11, 2025

(54) SYSTEM AND METHODS FOR THE RESILIENT AI-BASED DATA-DRIVEN DISPATCH OF A BATTERY ENERGY STORAGE SYSTEM

(71) Applicants: Arif Islam Sarwat, Miami, FL (US); Alexander Joseph Stevenson, Miami, FL (US)

(72) Inventors: Arif Islam Sarwat, Miami, FL (US); Alexander Joseph Stevenson, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 19/288,553

(22) Filed: Aug. 1, 2025

(51) Int. Cl.
*H02J 3/38* (2006.01)
*H02J 3/00* (2006.01)
*H02J 3/28* (2006.01)

(52) U.S. Cl.
CPC .............. *H02J 3/381* (2013.01); *H02J 3/003* (2020.01); *H02J 3/004* (2020.01); *H02J 3/28* (2013.01); *H02J 3/388* (2020.01); *H02J 2203/20* (2020.01); *H02J 2300/24* (2020.01)

(58) Field of Classification Search
CPC .. H02J 3/381; H02J 3/003; H02J 3/388; H02J 3/004; H02J 3/28; H02J 2300/24; H02J 2203/20

USPC .......................................................... 307/80
See application file for complete search history.

(56) References Cited

U.S. PATENT DOCUMENTS

| | | | |
|---|---|---|---|
| 2019/0131923 A1* | 5/2019 | Hooshmand | H02J 3/003 |
| 2020/0028363 A1* | 1/2020 | Farrokhabadi | H02J 3/32 |
| 2023/0155387 A1* | 5/2023 | Farrokhabadi | G05B 13/042 700/287 |
| 2024/0119281 A1* | 4/2024 | Khalid | G06N 3/045 |

* cited by examiner

Primary Examiner — Alfonso Perez Borroto
(74) Attorney, Agent, or Firm — SALIWANCHIK, LLOYD & EISENSCHENK

(57) ABSTRACT

Systems, architectures, devices, and methods for the resilient artificial intelligence-based data-driven dispatch of a battery energy storage system (BESS) are provided. A Mixed-Integer Linear Programming-based BESS dispatch scheduling algorithm utilizes location-specific weather data to forecast photovoltaic generation, load consumption, and grid outages using a plurality of machine learning models, in combination with market data to optimize energy dispatch decisions. A sustainable solution is provided for enabling improved load management during islanded conditions, providing advance operator alerts to enhance safety, and delivering economic benefits by minimizing unplanned outages, reducing associated financial losses, and offsetting high capital costs of BESS deployment through optimized utilization.

20 Claims, 24 Drawing Sheets

| Standard | Full scope | Key features for EMS development |
|---|---|---|
| IEEE 2030-2011 | Guide for smart grid interoperability of energy technology and information technology. Covers data exchange protocols, performance requirements, and interoperability recommendations. | • Defines standard interfaces and protocols for seamless integration. • Provides a reference architecture for designing interoperable EMSs for DERs. |
| IEEE 2030.5-2018 | Guidelines for smart energy profile application protocol. Communication between smart energy devices, demand response support, energy usage reporting, home energy management integration. | • Specifies Smart Energy Profile 2.0 for secure and standardized data exchange. • Real-time monitoring/control of DERs through standardized commands and data formats. |
| IEEE 2030.7-2017 | Specification of microgrid controllers. Functional and performance criteria, control strategies, communication protocols, grid integration guidelines. | • Describes the recommended interaction between tertiary-level control and the microgrid controller. |
| IEEE 2030.8-2018 | Guidelines for testing of microgrid various controllers. Performance validation and reliability, test case scenarios, performance metrics, and compliance requirements. | • Testbed recommendations and guidelines for validating microgrid controllers. • Data monitoring and metering for validation of control processes. |
| IEEE 2030.9-2018 | Recommended practices for the planning and design of microgrids. Focusing on operational integration, as well as specifying communication and control for various aspects of microgrid design. | • Forecasting of power generation, DER management, load management, web functionality. • Rolling 24-hr power plans. Specification of a 15-min time resolution. |

FIG. 17

| Metric | PV forecaster | Load forecaster |
|---|---|---|
| RMSE | 79.386 | 27.266 |
| MSE | 6302.111 | 743.427 |
| R2 | 0.803 | 0.584 |
| MAE | 40.910 | 16.585 |
| MAPE | 2.266 | 0.112 |

FIG. 18

| System | Parameter | Value | Unit |
|---|---|---|---|
| BESS | Rated Capacity | 9 | MWh |
| BESS | Inverter Rated Power | 3 | MWAC |
| BESS | Charge Efficiency | 95 | % |
| BESS | Discharge Efficiency | 95 | % |
| BESS | Ramp Rate | 600 | kW/min |
| BESS | Upper SOC Limit | 90 | % |
| BESS | Lower SOC Limit | 20 | % |
| PV | Rated Power (DC) | 1.4 | MWDC |
| PV | Cable Loss Efficiency | 99 | % |
| PV | De-rate Efficiency | 99 | % |
| PV | Mismatch Efficiency | 98 | % |
| PV | Soiling Efficiency | 100 | % |
| PV | Inverter Efficiency | 98 | % |
| PV | Temperature Coefficient | −0.5 | − |
| Grid | X/R Ratio | 7 | − |
| Grid | Maximum Import | +∞ | MWAC |
| Grid | Maximum Export | −∞ | MWAC |
| Load | Power Consumption | 0.8–1.1 | MWAC |
| Load | Conductor Lengths | 0.1 | km |

FIG. 19

| Stage | Min. Time | Ave. Time | Max. Time |
|---|---|---|---|
| Weather Forecast | 0.613 s | 1.028 s | 1.973 s |
| Market Pricing | 0.974 s | 2.152 s | 4.210 s |
| PV Forecast | 1.356 s | 1.471 s | 1.545 s |
| Load Forecast | 0.227 s | 0.230 s | 0.237 s |
| MILP Solution | 1.179 s | 1.229 s | 1.282 s |
| Whole Algorithm | 4.349 s | 6.110 s | 9.247 s |

FIG. 20

(a) Microgrid configuration cases

| Case | Pricing | PV? | BESS? | BESS Algorithm |
|---|---|---|---|---|
| 1 | TOU | No | No | — |
| 2 | TOU | Yes | No | — |
| 3 | TOU | Yes | Yes | Back-Up Only |
| 4 | TOU | Yes | Yes | RB |
| 5 | TOU | Yes | Yes | MLP |
| 6 | LMP | No | No | — |
| 7 | LMP | Yes | No | — |
| 8 | LMP | Yes | Yes | Back-Up Only |
| 9 | LMP | Yes | Yes | RB (Med) |
| 10 | LMP | Yes | Yes | RB (Ave) |
| 11 | LMP | Yes | Yes | MLP |

(b) Resulting LCOE using TOU

| Case | Cr | Cc | LCOE | LCOE Reduction |
|---|---|---|---|---|
| 1 | $0 | $9,396,251 | $0.06277 | Base Case 1 (BC 1) |
| 2 | $2,335,810 | $6,172,050 | $0.05683 | 9.46% From BC 1 |
| 3 | $6,029,650 | $6,172,050 | $0.06151 | Base Case 2 (BC 2) |
| 4 | $6,029,650 | $5,440,657 | $0.07662 | 6.08% From BC 2 |
| 5 | $6,029,650 | $5,522,837 | $0.07717 | 5.33% From BC 2 |

(c) Resulting LCOE using LMP

| Case | Cr | Cc | LCOE | LCOE Reduction |
|---|---|---|---|---|
| 6 | $0 | $4,019,561 | $0.01802 | Base Case 3 (BC 3) |
| 7 | $2,335,810 | $2,803,142 | $0.03436 | −90.7% From BC 3 |
| 8 | $6,029,650 | $2,803,142 | $0.05905 | Base Case 4 (BC 4) |
| 9 | $6,029,650 | $2,531,833 | $0.05721 | 3.13% From BC 4 |
| 10 | $6,029,650 | $2,526,408 | $0.05716 | 3.20% From BC 4 |
| 11 | $6,029,650 | $2,160,415 | $0.05476 | 7.27% From BC 4 |

FIGS. 21(a)-21(c)

| Case # | PV & Load forecast bias errors | 1Yr Unpaid generation | Final LCOE | LCOE % reduction |
|---|---|---|---|---|
| 11.1 | PV: -10%, Load: -10% | 12.75 MWh | $0.05490 | -0.055% |
| 11.2 | PV: -10%, Load: 0% | 80.14 MWh | $0.05508 | -0.383% |
| 11.3 | PV: -10%, Load: 10% | 141.13 MWh | $0.05524 | -0.674% |
| 11.4 | PV: 0%, Load: -10% | 0.33 MWh | $0.05492 | -0.091% |
| 11.5 | PV: 0%, Load: 0% | 0.77 MWh | $0.05487 | Base Case 5 |
| 11.6 | PV: 0%, Load: 10% | 79.96 MWh | $0.05509 | -0.401% |
| 11.7 | PV: 10%, Load: -10% | 0.24 MWh | $0.05498 | -0.200% |
| 11.8 | PV: 10%, Load: 0% | 0.28 MWh | $0.05492 | -0.091% |
| 11.9 | PV: 10%, Load: 10% | 13.34 MWh | $0.05491 | -0.073% |

(a)

| Case # | Forecast bias errors | 1Yr Unpaid generation | Final LCOE | LCOE % reduction |
|---|---|---|---|---|
| 11.10 | PV: -10%, Load: -10% | 7.07 MWh | $0.05477 | -0.018% |
| 11.11 | PV: -10%, Load: 0% | 26.82 MWh | $0.05483 | -0.128% |
| 11.12 | PV: -10%, Load: 10% | 41.08 MWh | $0.05486 | -0.183% |
| 11.13 | PV: 0%, Load: -10% | 0 MWh | $0.05477 | -0.018% |
| 11.14 | PV: 0%, Load: 0% | 0 MWh | $0.05476 | Base Case 6 |
| 11.15 | PV: 0%, Load: 10% | 20.41 MWh | $0.05481 | -0.091% |
| 11.16 | PV: 10%, Load: -10% | 0 MWh | $0.05479 | -0.055% |
| 11.17 | PV: 10%, Load: 0% | 0 MWh | $0.05477 | -0.018% |
| 11.18 | PV: 10%, Load: 10% | 0 MWh | $0.05476 | 0% |

SYSTEM AND METHODS FOR THE RESILIENT AI-BASED DATA-DRIVEN DISPATCH OF A BATTERY ENERGY STORAGE SYSTEM

BACKGROUND

Distributed Energy Resources (DERs) have emerged as a significant advancement in modern power systems. A DER generally refers to any small-scale electricity generation or storage technology that is situated near the point of electricity consumption, as opposed to traditional large-scale, centralized power plants. Various types of DERs are known in the field. Renewable generation technologies, such as photovoltaic (PV) solar panels and small wind turbines, utilize naturally occurring energy sources to produce clean electrical power. Additionally, battery energy storage systems (BESSs) are employed to store surplus electricity generated during periods of low demand, enabling the stored energy to be utilized during peak load intervals or in response to interruptions in the main electrical grid.

During normal environmental and grid operating conditions, the charging and discharging of BESS may be economically optimized through scheduled dispatch in response to intraday fluctuations in energy market prices, thereby enabling energy arbitrage and facilitating a return on investment over the operational lifetime of the system. However, during forecasted periods of extreme weather or other events that reduce grid reliability, it may be preferable to conserve stored energy for potential deployment during a grid outage. This strategy is particularly critical in microgrid configurations, where the BESS is relied upon to support local critical loads during islanded operation.

BRIEF SUMMARY

To address the challenges discussed in the Background, embodiments of the subject invention provide novel and advantageous systems, architectures, devices, and methods for the resilient artificial intelligence (AI)-based data-driven dispatch of a battery energy storage system (BESS) to ensure economic BESS operation.

In an embodiment, a system for the resilient AI-based data-driven dispatch of a BESS, the system can comprise: a processor; and a machine-readable medium in operable communication with the processor and having instructions stored thereon that, when executed by the processor, perform the following steps: a) collecting a weather forecast based on geographical coordinates of a microgrid via an Application Programming Interface (API); b) collecting a market forecast from available energy market data accessed via the API; c) retrieving internal system parameters comprising State of Charge (SOC) directly from the BESS; d) generating a photovoltaic (PV) generation prediction of an on-site solar canopy using collected data and a first machine learning (ML) model; e) generating a load consumption prediction of on-site loads using collected data and a second ML model; f) generating a regional outage prediction of a surrounding distribution system using collected data and a third ML model; g) calculating charge requirements to address detected outage event durations using a rule-based (RB) method; h) determining a dispatch profile for the BESS to achieve optimal economic return using a Mixed-Integer Linear Programming (MILP)-based method; i) transmitting recommended control setpoints based on the dispatch profile generated at a tertiary control level of a microgrid control system to a secondary control level; and j) in response to (or upon) detecting an energy deficit or an energy surplus within the microgrid, effectuating energy purchase from a main grid through a Point of Common Coupling (PCC) (in the case of an energy deficit within the microgrid) or effectuating sale to the main grid through the PCC (in the case of an energy surplus within the microgrid). Any or all steps a)-j) can be implemented within the microgrid, which can be a grid-tied microgrid and/or can comprise comprising PV components and/or BESS components. The microgrid can operate in accordance with the specifications defined in Institute of Electrical and Electronics Engineers (IEEE) Standard 2030.7-2017 to support interoperable integration, reliable performance, and efficient operation of a (or the) BESS within a utility grid infrastructure. The first ML model (used in step d)) can comprise a Support Vector Regression (SVR) model configured to process input features comprising ambient temperature, module temperature, and/or Plane of Array (POA) irradiance. The second ML model (used in step e)) can comprise a regression tree model configured to process input features comprising ambient temperature, a month indicator, an hour-of-day indicator, and/or a working day indicator specifying whether a given day is a working day. The third ML model (used in step f)) can comprise a hybrid Long Short-Term Memory (LSTM) and Convolutional Neural Network (CNN) model, the third ML model being configured to receive forecasted local weather measurements as time series data and radar imagery representing spatial weather conditions as inputs. The instructions, when executed, can further perform the following step: upon prediction of an outage, initiating a proactive islanding trigger of local loads to alert grid operators and the microgrid control system of an impending intentional islanding operation. The system can further comprise a controller device operatively coupled to the microgrid, which can be configured to communicate with downstream client devices (e.g., Programmable Logic Controllers (PLCs), the secondary control level of the microgrid control system, and/or one or more devices having access to operational site data relevant to the operation of the controller device). The controller device can be connected to a cloud-based application for remote monitoring and review and be accessible on-site for visualizing operational data and adjusting device settings. The controller device can comprise: (i) a backend server configured to execute embedded code and to communicate with user-interactive applications and backend code of the controller device; (ii) configuration files and the (trained) first, second, and/or third ML models stored in the backend server; (iii) a communication interface configured to manage data exchange with client devices (e.g., via Modbus); and/or (iv) a database configured to store operational parameters for visualization.

With respect to generating a regional outage prediction of a surrounding distribution system (step f)), a multi-modal ML approach that utilizes time sequence features along with image recognition layers can be trained to predict regional customer outage data based on historical radar and weather data. Then, using forecasted radar and weather, the multi-modal ML approach (third ML model) can generate predictions for upcoming weather events. With respect to the RB method (in step g)), it can use outage predictions acquired by the previous multi-modal regional outage predictor (step f)) to calculate the expected charge needed to overcome outages over a certain threshold value. When the outage predictions reach a specific threshold, a minimum level of charge is required to be held in the battery. If the battery does not have this amount of charge, it can enter RB mode and it can automatically gain this charge until it has reached the required amount, and then it can revert back to its original economic mode (within charge thresholds). With respect to the LSTM and CNN model, the inputs and outputs are important while the actual architecture is highly adaptable and contains many tweakable components and would not change the output, only its prediction accuracy. The LSTM and CNN model (third model) can utilize time sequence features along with image recognition layers to be trained to predict regional customer outage data based on historical radar and weather data (and can then use forecasted radar and weather to generate predictions for upcoming weather events).

In another embodiment, a method for the resilient AI-based data-driven dispatch of a BESS can comprise: a) collecting a weather forecast based on geographical coordinates of a microgrid via an API; b) collecting a market forecast from available energy market data accessed via the API; c) retrieving internal system parameters comprising SOC directly from the BESS; d) generating a PV generation prediction of an on-site solar canopy using collected data and a first ML model; e) generating a load consumption prediction of on-site loads using collected data and a second ML model; f) generating a regional outage prediction of a surrounding distribution system using collected data and a third ML model; g) calculating charge requirements to address detected outage event durations using an RB method; h) determining a dispatch profile for the BESS to achieve optimal economic return using an MILP-based method; i) transmitting recommended control setpoints based on the dispatch profile generated at a tertiary control level of a microgrid control system to a secondary control level; and j) in response to (or upon) detecting an energy deficit or an energy surplus within the microgrid, effectuating energy purchase from a main grid through a PCC (in the case of an energy deficit within the microgrid) or effectuating sale to the main grid through a PCC (in the case of an energy surplus within the microgrid). Any or all steps a)-j) can be implemented within the microgrid, which can be a grid-tied microgrid and/or can comprise PV components and/or BESS components. The microgrid can operate in accordance with the specifications defined in IEEE Standard 2030.7-2017 to support interoperable integration, reliable performance, and efficient operation of a (or the) BESS within a utility grid infrastructure. The first ML model (used in step d)) can comprise an SVR model configured to process input features comprising ambient temperature, module temperature, and/or POA irradiance. The second ML model (used in step e)) can comprise a regression tree model configured to process input features comprising ambient temperature, a month indicator, an hour-of-day indicator, and/or a working day indicator specifying whether a given day is a working day. The third ML model (used in step f)) can comprise a hybrid LSTM and CNN model, the third ML model being configured to receive forecasted local weather measurements as time series data and radar imagery representing spatial weather conditions as inputs. The method can further comprise: upon prediction of an outage, initiating a proactive islanding trigger of local loads to alert grid operators and the microgrid control system of an impending intentional islanding operation. The method can further comprise operatively coupling a controller device to the microgrid, and the controller device can be configured to communicate with downstream client devices (e.g., PLCs, the secondary control level of the microgrid control system, and/or one or more devices having access to operational site data relevant to the operation of the controller device). The controller device can be connected to a cloud-based application for remote monitoring and review and be accessible on-site for visualizing operational data and adjusting device settings. The controller device can comprise: (i) a backend server configured to execute embedded code and to communicate with user-interactive applications and backend code of the controller device; (ii) configuration files and the (trained) first, second, and/or third ML models stored in the backend server; (iii) a communication interface configured to manage data exchange with client devices (e.g., via Modbus); and/or (iv) a database configured to store operational parameters for visualization. Any or all steps or sub-steps can be performed by a processor.

BRIEF DESCRIPTION OF DRAWINGS

FIG. 6(a) shows the actual and predicted load consumption over time. The x-axis represents time in 15-minute intervals, and the y-axis indicates energy consumption in kilowatt-hours (kWh). The graph includes two plotted lines: a first line representing actual load consumption and a second line representing predicted load consumption. The actual load consumption exhibits fluctuations throughout the day, with observable increases during certain time periods. The predicted load consumption generally follows the same trend as the actual load consumption. However, the predicted values tend to be overestimated, particularly during periods of elevated consumption. FIG. 6(b) shows the actual and predicted PV generation alongside the actual and predicted solar irradiance over time. The x-axis shows time in 15-minute intervals. There are two y-axes: the left y-axis measures power in kilowatts (kW) for the PV generation data, while the right y-axis measures irradiance in watts per square meter (W/m$^2$) for the solar irradiance data. The actual and predicted PV generation are plotted as two separate solid lines, while the actual and predicted irradiance are shown as two separate dashed lines. All four curves follow a daily cycle, with values rising in the morning, peaking around midday, and falling to near zero at night. The predicted irradiance closely follows the actual irradiance pattern, indicating good model accuracy. The predicted PV generation also aligns well with the actual values, though it may slightly underestimate peak values.

FIG. 8(a) shows the relationship between cloud cover, temperature, and ideal solar irradiance. The left y-axis represents cloud cover in percentage (%) and temperature in degrees Fahrenheit (° F.), while the right y-axis shows ideal irradiance in watts per square meter (W/m$^2$). The cloud cover varies significantly throughout the day, with frequent peaks and dips. In contrast, the temperature remains relatively steady with minor fluctuations. The ideal irradiance follows a consistent daily cycle, increasing in the morning, peaking at midday, and decreasing toward evening before dropping to zero at night. FIG. 8(b) compares actual PV generation with load consumption. The y-axis indicates energy in kilowatt-hours (kWh). PV generation appears as sharp, repeating peaks during daylight hours, aligning with the irradiance cycle, and drops to near-zero at night. Load consumption, on the other hand, remains relatively steady with gradual fluctuations and does not follow the same daily cycle as PV generation. FIG. 8(c) shows Locational Marginal Price (LMP) of electricity, which is the cost of delivering the next unit of electricity at a specific location. The y-axis measures price in dollars per kWh. The price fluctuates throughout the day, showing several peaks and troughs over the time period.

FIG. 10(a) shows a line graph with two y-axes. The left y-axis represents power (kW) ranging from 0 to 1,600, and the right y-axis represents energy (kWh) ranging from 0 to 5,000. The x-axis is labeled "Timestep (15-minute)" and ranges from 0 to 100. Six different quantities are plotted. On the left y-axis, "Actual Load", "Actual PV", "Predicted Load", "Predicted PV", "Load Error", and "PV Error" are shown. "Actual Load" and "Predicted Load" generally hover between 800 and 900 kW, with "Predicted Load" showing a peak around 1,200 kW between timestep 40 and 60, before gradually decreasing. "Actual PV" and "Predicted PV" show a bell-shaped curve, rising from 0 kW to a peak around 800-900 kW between timestep 40 and 60, and then falling back to 0 kW. "Load Error" and "PV Error" fluctuate, generally staying below 400 kW. On the right y-axis, "Accumulated Load Energy Error" and "Accumulated PV Energy Error" are presented. "Accumulated Load Energy Error" shows a steady increase across the entire timestep range, starting near 0 kWh and reaching approximately 4,200 kWh at timestep 90. "Accumulated PV Energy Error" increases from 0 kWh, reaching a plateau around 1,200 kWh after timestep 70. FIG. 10(b) shows a time-series plot related to BESS SOC. The x-axis is "Timestep (15-minute)". There are two y-axes: the left y-axis is "SOC (%)" ranging from 0 to 100, and the right y-axis is "BESS SOC Error" ranging from 0 to 35. Three quantities are plotted. On the left y-axis, "Actual BESS SOC" and "Scheduled BESS SOC" are shown. "Scheduled BESS SOC" generally follows a saw-tooth pattern, varying between approximately 45% and 90% SOC. "Actual BESS SOC" also follows a similar fluctuating pattern, but often deviates from the "Scheduled BESS SOC", particularly between timestep 60 and 90 where it drops significantly lower than the scheduled value before recovering slightly. On the right y-axis, "BESS SOC Error" is plotted as a dashed line. This error starts near 0, gradually increases with some plateaus, and then rises sharply after timestep 80, reaching a maximum of over 30 at timestep 90.

FIG. 12(a) shows a dual y-axis line graph. The left y-axis represents "Irradiance (W/m$^2$)" ranging from 0 to 1,000. The right y-axis represents "Cloud Cover (%)" and "Temperature (F)", both ranging from 0 to 100. The x-axis, "Timestep (15-minute)," spans from 0 to 35,000. The graph shows a line for "Irradiance (W/m$^2$)" which fluctuates significantly, often reaching high values during daylight hours and dropping to zero at night. Another line represents "Cloud Cover (%)" which shows high variability, often inversely correlated with irradiance. A third line depicts "Temperature (F)" which exhibits a diurnal and seasonal pattern, generally staying within a narrower band compared to irradiance and cloud cover. FIG. 12(b) shows a dual y-axis line graph. The left y-axis represents "Energy (kWh)" ranging from 0 to 500. The right y-axis also represents "Energy (kWh)", with an identical scale. The x-axis, "Timestep (15-minute)," spans from 0 to 35,000. Two lines are plotted: "PV (kWh)" and "Load (kWh)". The "PV (kWh)" line shows large fluctuations, indicating periods of high generation and periods of no generation, likely following a daily cycle. The "Load (kWh)" line shows a more consistent but still fluctuating pattern, generally staying above zero. FIG. 12(c) shows one year of Time-of-Use (TOU) electricity pricing data for the Miami, Florida region in addition to LMP data from the Pennsylvania-New Jersey- Maryland (PJM) market, specifically corresponding to Price Node ID 48592 within Zone Public Service Enterprise Group (PSEG) representing a line graph with the y-axis representing "Price ($/kWh)" ranging from 0 to 0.30. The x-axis, "Timestep (15-minute)," spans from 0 to 35,000. Two data series are plotted: "Locational Marginal Price ($/kWh)" and "TOU Price ($/kWh)". The "Locational Marginal Price ($/kWh)" is represented by a fluctuating line that generally stays low, but occasionally shows significant spikes to higher values. The "TOU Price ($/kWh)" is represented by a series of distinct, flat steps at a constant lower price, indicating a fixed price for specific time periods.

FIG. 13(a) shows TOU and LMP data over the one-week interval representing a line graph with the y-axis representing "Price (/kWh)" from 0 to 0.08, and the x-axis representing "Timestep (15-minute)" from 0 to 650. Three lines are plotted: "LMP (/kWh)" (a fluctuating line with occasional peaks), "TOU Price ($/kWh)" (a stepped line showing periods of higher and lower fixed prices), and "Average LMP" (a relatively flat line indicating the average of the locational marginal price). The TOU price shows a distinct pattern of periods at a higher constant value followed by periods at a lower constant value. FIG. 13(b) shows the baseline RB control results based on TOU pricing. FIG. 13(c) shows RB control results corresponding to LMP. FIG. 13(d) shows Mixed-Integer Linear Programming (MILP) control results for TOU pricing. FIG. 13(e) shows MILP control results corresponding to LMP. FIGS. 13(b)-13(e) show all similar dual-axis line graphs. For each of the figures, the left y-axis represents "Energy (kWh)" ranging from −200 to 600, and the right y-axis represents "BESS SOC (%)" ranging from 0 to 100. The x-axis for all is "Timestep (15-minute)" from 0 to 650. Each graph plots four lines: "Load" (generally positive, fluctuating), "Grid" (fluctuating, can be positive or negative), "PV" (generally positive, shows periods of generation and no generation), and "BESS" (fluctuating, can be positive or negative, representing battery energy flow), and "BESS SOC" (a dashed line, representing the battery's state of charge). The specific patterns and interactions between these lines, particularly the BESS and BESS SOC, vary slightly between FIGS. 13(b)-13(e), showing different operational scenarios or optimizations. The BESS SOC line in each of these four figures shows charging (increasing SOC) and discharging (decreasing SOC) cycles, with the "BESS" line indicating power flow into or out of the battery. The PV line consistently shows a daily generation pattern, peaking during daylight hours. The Load and Grid lines demonstrate the balance of energy demand and supply, with the Grid line indicating power drawn from or fed back into the grid.

FIG. 17 shows a table of a summary of standards relevant to distributed energy resources (DER) and BESS.

FIG. 18 shows a table of PV generation and load consumption kilowatt (kW) forecasting metrics (RMSE: Root Mean Squared Error, MSE: Mean Squared Error, R2: R Squared Metric, MAE: Mean Absolute Error, and MAPE: Mean Absolute Percentage Error).

FIG. 19 shows a table of a comprehensive list of simulated power system parameters utilized during Hardware-In-The-Loop (HIL) simulation.

FIG. 20 shows a table of execution times for each stage of the BESS dispatch scheduling algorithm, along with the overall runtime.

FIGS. 21(a)-21(c) show tables associated with economic analysis. FIG. 21(a) shows a table of various microgrid configuration case. FIG. 21(b) shows a table of a summary of Levelized Cost of Energy (LCOE) results based on TOU pricing. FIG. 21(c) shows a table of a summary of LCOE results based on LMP.

FIGS. 22(a)-22(b) show tables of resulting unpaid generation, LCOE, and LCOE performance reduction due to PV generation and load consumption forecast error cases. FIG. 22(a) shows results under a grid export limit of 0.5 MW. FIG. 22(b) shows results under a grid export limit of 1.0 MW.

DETAILED DESCRIPTION

Figure 1:
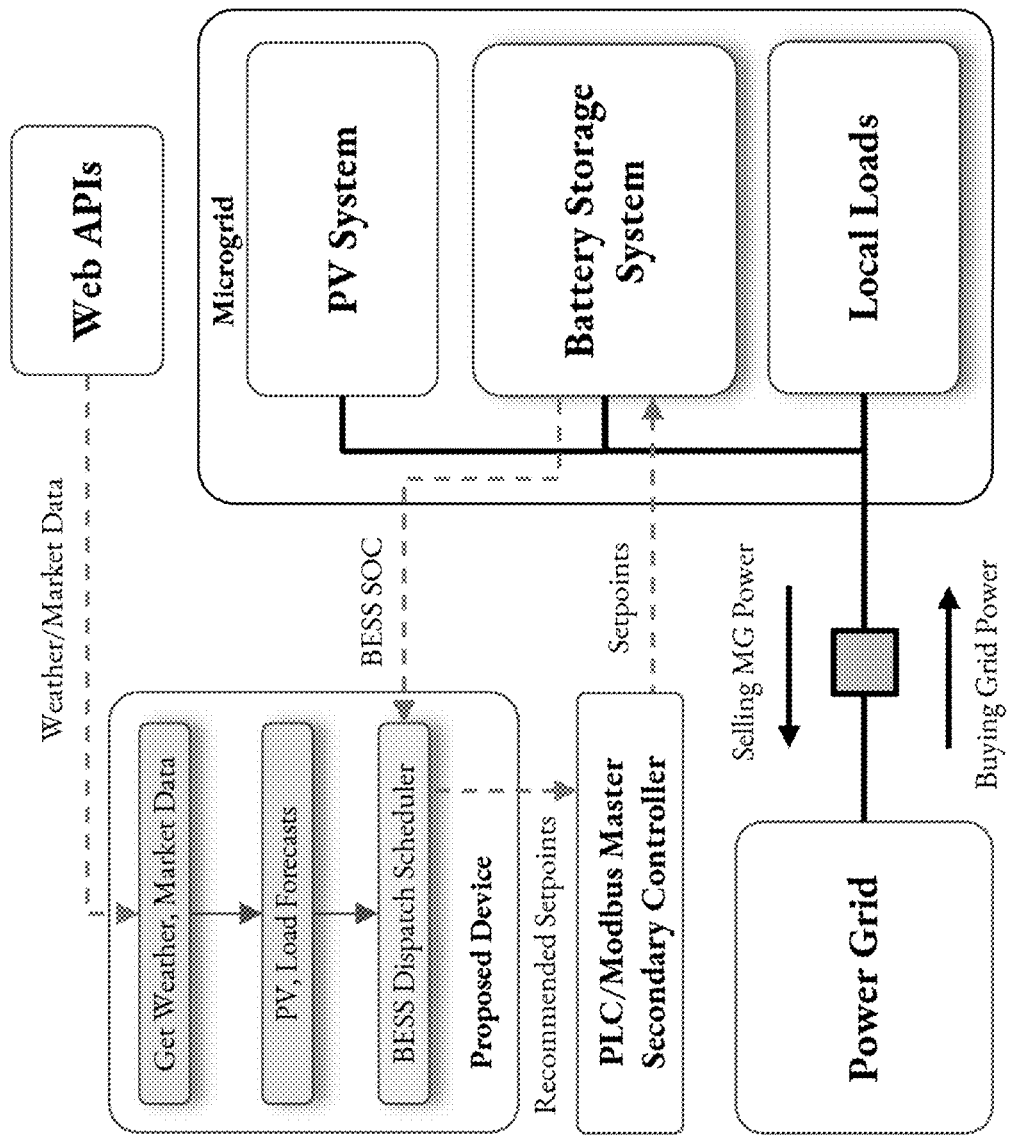
FIG. 1 shows operation of a battery energy storage system (BESS) dispatch scheduling algorithm within a grid-tied microgrid comprising photovoltaic (PV) and BESS components, according to an embodiment of the subject invention.

Embodiments of the subject invention provide novel and advantageous systems, architectures, devices, and methods for the resilient artificial intelligence (AI)-based data-driven dispatch of a battery energy storage system (BESS). A key aspect of embodiments of the subject invention is the development of a data-driven dispatch scheduling algorithm for a BESS, implemented using a Mixed-Integer Linear Programming (MILP) framework. The algorithm is configured for deployment within a grid-tied microgrid comprising PV generation resource and BESS. The system is designed to comply with the interoperability, performance, and operational criteria specified in Institute of Electrical and Electronics Engineers (IEEE) Standard 2030.7-2017. This compliance enables interoperable integration with utility grid infrastructure, ensures reliable performance of energy management functions, and promotes efficient operation of the BESS within the microgrid environment.

A microgrid is a localized group of electricity sources and loads that can operate connected to the main power grid or independently in "island mode," integrating Distributed Energy Resources (DERs) such as solar panels, wind turbines, BESS, and controllable loads to supply reliable, resilient, and efficient power to a specific area such as a campus or facility. The control architecture of the microgrid is commonly organized into a hierarchical structure comprising three levels: primary, secondary, and tertiary control. Primary control is responsible for maintaining system stability by locally regulating voltage and frequency. Secondary control is responsible for restoring voltage and frequency to the nominal values following deviations or disturbances. Tertiary control manages the economic optimization and scheduling of power flows, including coordination with the main grid and participation in electricity markets. Integrated into an Energy Management System (EMS), the system plays a central role in ensuring the optimal operation of the microgrid. The level of tertiary control involves long-term planning, using demand and generation forecasts along with advanced algorithms to schedule energy use and maximize economic efficiency. Accurate forecasting of PV generation, load consumption, and grid outages is essential for the efficient operation of BESS within tertiary control framework. PV generation forecasting predicts the output of renewable energy sources, which is inherently variable due to factors like weather and time of day. Load consumption forecasting involves predicting future electricity demand based on historical data, weather conditions, and other relevant factors. By integrating the reliable PV generation, load consumption, and grid outages forecasts, tertiary control enables improved planning and scheduling of BESS operations, ensuring that energy storage can be used effectively to meet demand and support grid stability. Secondary and primary controls, while essential for maintaining power quality and immediate response to changes in operating conditions, rely on the strategic planning provided by tertiary control to function optimally.

To enhance economic efficiency BESSs, various methods have been developed. Although previous methods have demonstrated effective implementation of MILP-based control for various DERs, the previous methods fail to adequately address the applicable standards governing system implementation. A plurality of standards has been established to ensure interoperability, reliability, and operational efficiency of BESS within the broader energy grid. Standards developed by the IEEE in North America, including IEEE 2030-2011, IEEE 2030.5-2018, IEEE 2030.7-2017, IEEE 2030.8-2018, and IEEE 2030.9-2019, and by the International Electrotechnical Commission (IEC) internationally, including IEC 61850:2024, IEC 61968:2022, IEC 61970:2024, and IEC 62351:2024, provide guidelines for communication protocols and system integration requirements applicable to BESS operation. The full scope summary of the North American IEEE standards relevant to microgrid and DER EMS dispatch functionality can be seen in FIG. 17. Additionally, the key features applicable to EMS development, as utilized in embodiments of the subject invention, are derived from IEEE 2030 series of standards and are also illustrated in FIG. 17.

Conventional approaches typically operate BESSs in a static manner, wherein only a single mode of operation is active at any given time. An operator or owner of the BESS generally selects a specific operational objective, including provision of ancillary services, economic optimization, or enhancement of system resilience, wherein the selected objective governs the control strategy and dispatch behavior of the BESS. In an embodiment, manual control of the BESS is no longer required to ensure economic performance while maintaining site resilience. Detection of anomalous grid and weather conditions using rule-based (RB) and AI-based methods, enabled by data-driven forecasting of photovoltaic (PV) generation, load consumption, and grid outages, facilitates automatic selection of operational modes to ensure resilient system performance under anomalous operating conditions. The system can predict grid outage durations and, in response, increase the charge reserve of the BESS when necessary, and in cases of severe grid instability, initiate proactive islanding of local loads if a calculated reliability score exceeds a predetermined threshold. Proactive islanding is a control method where a microgrid or local system intentionally isolates itself from the main grid before an anticipated outage. This preemptive disconnection ensures continuous power supply to critical loads by operating independently during grid disturbances, thereby enhancing system resilience and reliability. Reliability score is a quantitative metric that assesses the likelihood of sustained power supply to a system or load. The reliability score is derived from factors including grid stability, historical outage data, weather conditions, and equipment status.

"Bump-less" proactive islanding is a method for smoothly transitioning a microgrid from grid-connected to islanded mode without causing disturbances such as voltage dips or frequency fluctuations. This approach provides main grid and microgrid operators with advance notice of the islanding event, ensuring stability during and after the transition while safeguarding local loads under abnormal grid and weather conditions. Unintentional islanding caused by insufficient anticipation of grid conditions can destabilize both the main grid and the microgrid. Providing grid operators with advanced notice and control of islanding events may be incentivized, thereby further reducing the system Levelized Cost of Energy (LCOE).

Embodiments of the subject invention provide at least the following advantageous features: (1) the dynamic ability to determine the appropriate control mode based on statistically anomalous weather conditions, National Weather Service (NWS) alerts, and a machine learning (ML)-based outage prediction algorithm; (2) the ability to perform and utilize accurate PV generation and load consumption forecasting up to seven-day-ahead based on local weather forecasts and site-specific collected training data for model development; (3) the ability to perform seven-day-ahead economic scheduling of BESS charging and discharging based on accurate PV generation and load consumption forecasting, market pricing fluctuations, and BESS operational costs; (4) the ability to anticipate grid disturbances with high confidence using a ML method based on a hybrid Long Short-Term Memory (LSTM) and Convolutional Neural Network (CNN) model, wherein the model utilizes forecasted local weather measurements and radar imagery to predict the number of outages within a specified region; (5) the ability to proactively charge BESS assets to satisfy the cumulative demand over predicted outage durations; and (6) the ability to perform statistical outage threshold-based requests to an auxiliary system that can execute a seamless transition to islanded operation.

FIG. 1 shows the operation of the MILP-based data-driven BESS dispatch scheduling algorithm within a grid-tied microgrid comprising PV and BESS components, in accordance with the specifications set forth in IEEE 2030.7-2017. As part of a tertiary-level EMS function, the BESS dispatch scheduling algorithm is configured to periodically acquire relevant operational data from a plurality of external Application Programming Interfaces (APIs). The APIs can include market pricing interfaces and weather data providers. Additionally, internal system parameters such as the State of Charge (SOC) can be retrieved directly from the BESS to support informed scheduling decisions by the BESS dispatch scheduler. The system processes the acquired data to generate and transmit recommended control setpoints to the secondary-level microgrid controller, which functions as a Modbus Master Programmable Logic Controller (PLC). The control setpoints can be generated at the tertiary control level based on optimization algorithms or operational objectives and are subsequently transmitted to lower-level controllers (e.g., secondary or primary control layers) to guide distributed energy resource behavior in accordance with overall system goals. Modbus is a widely used protocol enabling communication among devices over a network. A PLC is a digital electronic device used for the automation and control of electromechanical processes. The PLC can be operable to receive sensor data, execute control algorithms, and transmit control signals to actuators or other system components to achieve desired operational objectives. The final control setpoints applied to the BESS are determined in accordance with additional control rules executed within the microgrid controller. In instances of energy surplus or deficit within the microgrid, energy may be purchased from or sold to the main grid via the Point of Common Coupling (PCC).

Figure 2:
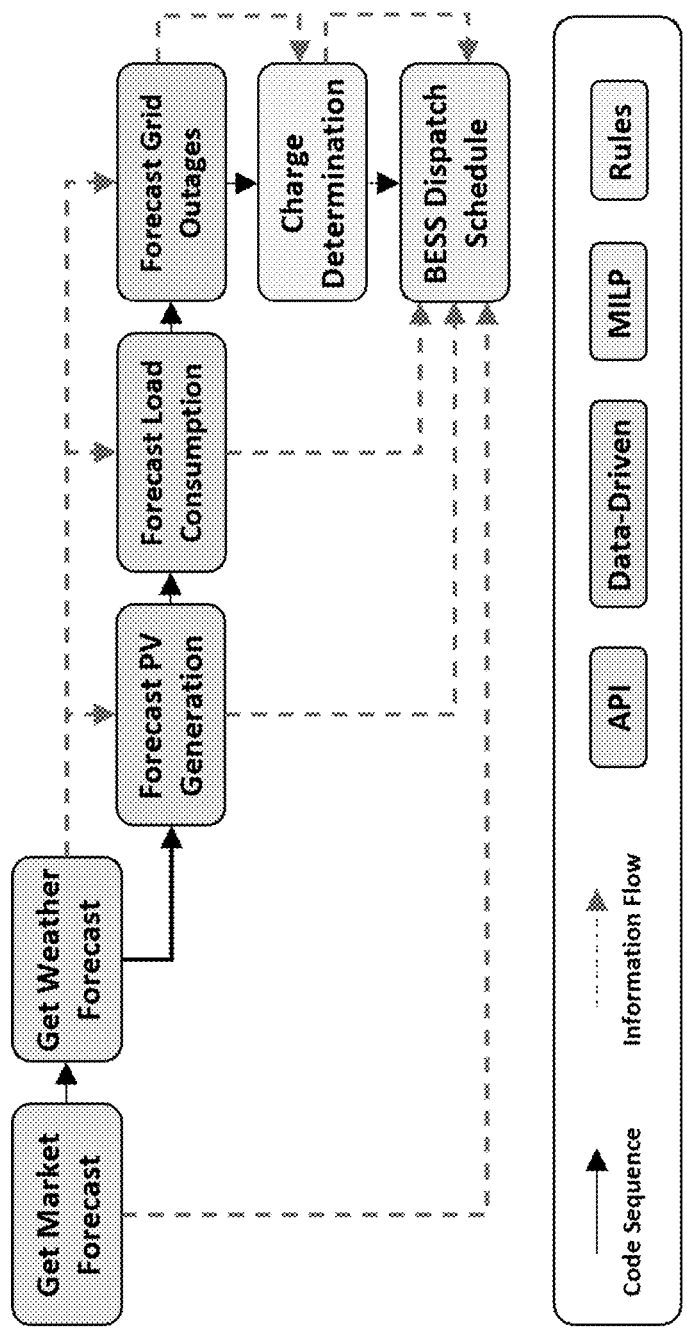
FIG. 2 shows an overview of a sequence of execution of the BESS dispatch scheduling algorithm for determining a BESS dispatch schedule, according to an embodiment of the subject invention.
Figure 15:
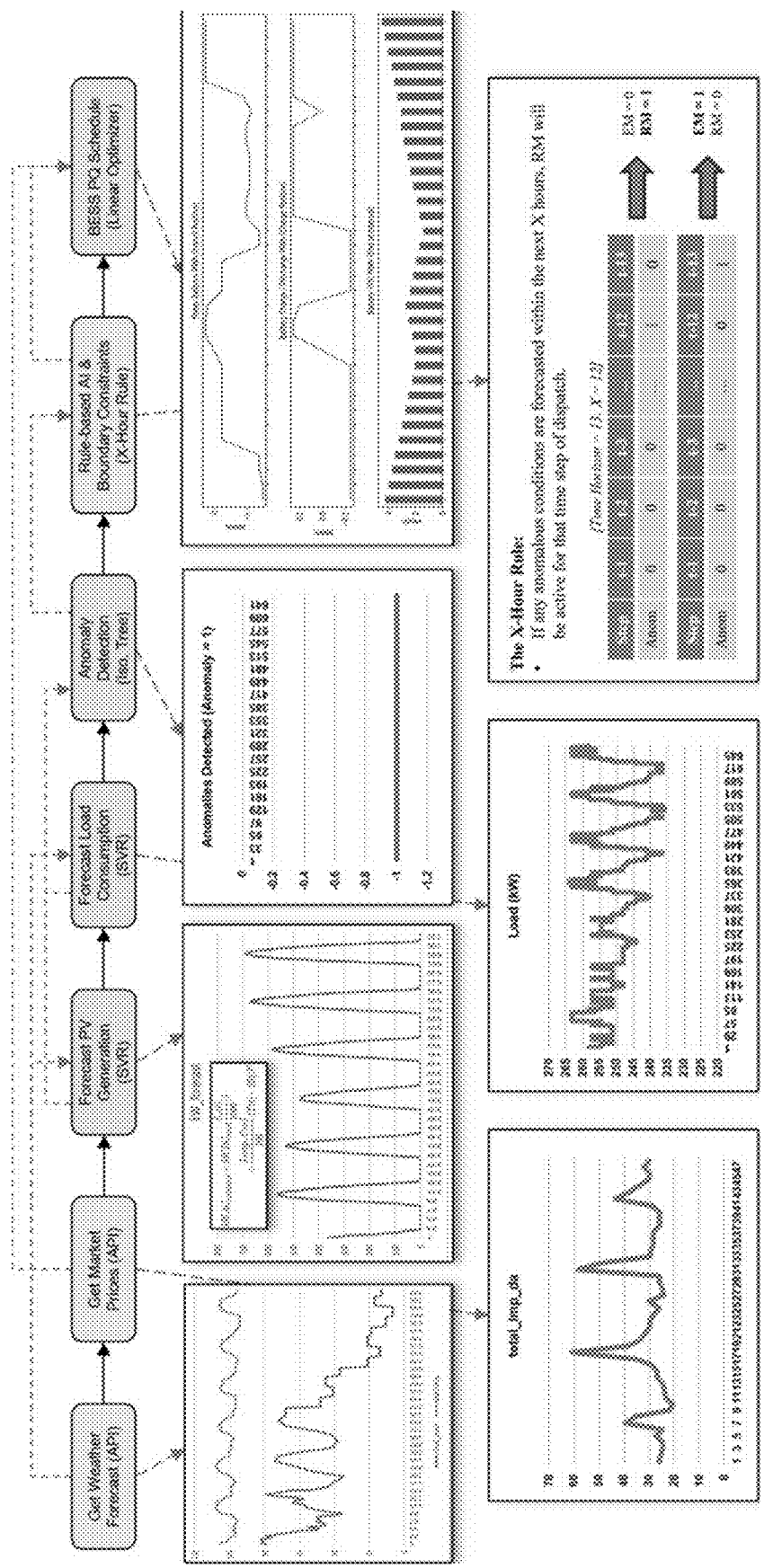
FIG. 15 shows a workflow of a sequence of execution of the BESS dispatch scheduling algorithm for a BESS for determining a BESS dispatch schedule including an example panel corresponding to each step, according to an embodiment of the subject invention.

Referring to FIGS. 2 and 15, the execution sequence of the BESS dispatch scheduling algorithm, including API data acquisition, PV generation, load consumption, and grid outages forecasting, and final BESS dispatch scheduling follows a seven-step process employing multiple data-driven ML techniques, as enumerated below:

Step 1. A day-ahead weather forecast based on geographical coordinates of a microgrid via an API.

Step 2. A day-ahead market forecast from available energy market data accessed via an API.

Step 3. The day-ahead PV generation prediction of an on-site solar canopy using collected data and data-driven ML techniques.

Step 4. The day-ahead load consumption prediction of on-site loads using collected data and data-driven ML techniques.

Step 5. The day-ahead regional outage prediction of a surrounding distribution system using data-driven ML techniques.

Step 6. The calculation of charge requirements to address detected outage event durations is performed using an RB method.

Step 7. A day-ahead dispatch profile for the BESS is generated to achieve optimal economic return using a MILP-based method.

Weather forecasting is a critical component of the BESS dispatch scheduling algorithm, providing essential data to enable accurate prediction of PV resource availability and load demand trends. A day-ahead weather forecast corresponding to the geographic location of the FIU Engineering Campus is obtained via the NWS API, based on the site's latitude) (25.770278° and longitude) (−80.366528° coordinates. The data received from the NWS API comprises ambient temperature, expressed in degrees Fahrenheit (° F.), and cloud coverage, expressed as a percentage. Ambient temperature refers to the temperature of the surrounding environment at or proximate to the PV installation site and constitutes a critical input parameter for forecasting and PV system performance modeling. The day-ahead weather data is utilized for PV generation, load consumption, and grid outages forecasting in subsequent stages of the scheduling algorithm. PV generation refers to electricity produced by PV systems, which convert sunlight directly into electrical energy using solar panels. Load consumption refers to the amount of electrical power used by devices or systems over a specific period of time.

Market price forecasting is instrumental for BESS arbitrage and economic scheduling, as the controller must determine optimal times to purchase electricity at low prices and sell at higher prices to maximize economic returns. Both the Pennsylvania-New Jersey-Maryland (PJM) day-ahead energy market prices, including the Public Service Enterprise Group (PSEG) zone with Price Node ID 48592, and the local utility Time-of-Use (TOU) on-peak and off-peak prices for Miami, Florida, are considered. The PJM day-ahead energy market prices are obtained using the publicly available PJM API.

The solar irradiance and PV generation forecasting methodology is based on established techniques identified in the literature. The approach employs Numerical Weather Prediction (NWP) data corresponding to site-specific latitude and longitude coordinates, combined with an ideal irradiance model, and supervised ML models to develop a Support Vector Regression (SVR) model for predicting Plane of Array (POA) irradiance. The selected scaled input features include module temperature, cloud cover, and ideal irradiance, chosen based on the strong correlation and capacity to explain over 97% of the variance in recorded irradiance. Module temperature refers to the actual temperature of a PV module during operation. A formulation is used to convert the irradiance forecast into a kilowatt (kW) forecast representing the total power output of the entire system. The formulation is set forth in Equations (1) and (2).

$$PV_{KWAC} = PV_{KWDC} \times \frac{GHI(t)}{1000} \times \left(1 + \frac{Tc}{100}(T(t) - Tn)\right) \times f \qquad (1)$$

$$f = \eta_{mis} \times \eta_{inv} \times \eta_{cable} \times \eta_{soil} \qquad (2)$$

where $PV_{KWAC}$ denotes the rated Alternating Current (AC) power output of the PV system in kW; $PV_{KWDC}$ denotes the rated Direct Current (DC) power output of the PV system in kW; GHI(t) represents the Global Horizontal Irradiance (GHI) at time t; Tc corresponds to the temperature coefficient of the PV module; T(t) represents the module temperature at time t; Tn denotes the nominal PV module temperature; typically 25 degrees Celsius (C); f denotes the derating factor; $\eta_{mis}$ denotes the derating factor due to module mismatch; $\eta_{inv}$ denotes the PV inverter efficiency; $\eta_{cable}$ denotes the derating factor due to cable losses; and $\eta_{soil}$ denotes the derating factor due to soiling.

Data for training the PV forecaster was collected from the grid-tied inverters of the 1.4 megawatts direct current (MWDC) PV array located at the microgrid of the FIU Engineering Campus, spanning Oct. 8, 2019, through Nov. 4, 2022. Accordingly, the dataset comprises a total of 27,179 data records, each record containing timestamped input features including ambient temperature, module temperature, and POA irradiance. These input features are utilized for the training of the SVR model. In order to facilitate the training and evaluation of the SVR model, the dataset is partitioned into training and testing subsets. Specifically, approximately thirty percent (30%) of the total dataset is allocated for testing purposes, with 19,025 data records assigned to the training subset and 8,154 data records reserved for the testing subset.

For the PV SVR model, the hyperparameters are initialized based on optimal parameter configurations previously reported in the literature for solar forecasting applications. These pre-established hyperparameter values serve as the initial configuration to enhance model performance and convergence efficiency. The Radial Basis Function (RBF) kernel is selected as the kernel function for the SVR model. The SVR model is further configured with an epsilon (δ) value of 0.1 and a regularization parameter (C) set to 1. These parameter values are selected to balance model complexity and generalization capability in accordance with established practices in solar forecasting methodologies. Starting from the initial parameter configuration, a grid-search optimization procedure is executed in accordance with established methodologies for hyperparameter tuning in regression models. This optimization process systemically explores a predefined range of hyperparameter value to identify the combination that yields optimal predictive performance of the SVR model. As a result of the grid-search optimization procedure, an increase in the regularization strength was achieved by adjusting the regularization parameter (C) from an initial value of 1 to an optimized value of 100, thereby enhancing the L2 regularization effect. This adjustment led to an improvement in the training coefficient of determination (R2), with a recorded increase of approximately 3% relative to previously established baseline configurations. Furthermore, the optimized model demonstrated enhanced generalization performance, as evidenced by a higher testing R2 score of 0.803 obtained with C=100, compared to an R2 score of 0.671 observed when C was set to 1. These results substantiate the effectiveness of the grid-search methodology, as applied in accordance with established hyperparameter optimization techniques, in refining SVR model performance for PV generation forecasting applications.

The load consumption forecasting methodology employs a regression tree model, selected based on the demonstrated efficacy in prior demand forecasting studies and methodologies. The selection of the regression tree model is motivated by the capacity to handle non-linear relationships and the interpretability in forecasting electrical load patterns. Additionally, tree-based methods are well suited for the load consumption forecasting problem due to the compatibility with encoded categorical features, such as weekday indicators. The structure of a regression tree allows for binary decisions at each node, enabling effective partitioning of the data based on the presence or absence of specific feature values. Specifically, a histogram-based gradient boosting regression tree method is employed. The model is trained on scaled input features, including ambient temperature, month, hour of the day, and a binary indicator denoting whether the day is a working day. The model is developed based on a fast gradient boosting decision tree framework, previously established in the literature for the computational efficiency and predictive accuracy. This approach is considered optimal due to the ability to compute histograms from the underlying data distributions, which are subsequently utilized in the best-split selection process during tree construction. This technique enhances computational efficiency while maintaining model accuracy.

Figures 6A, 6B:
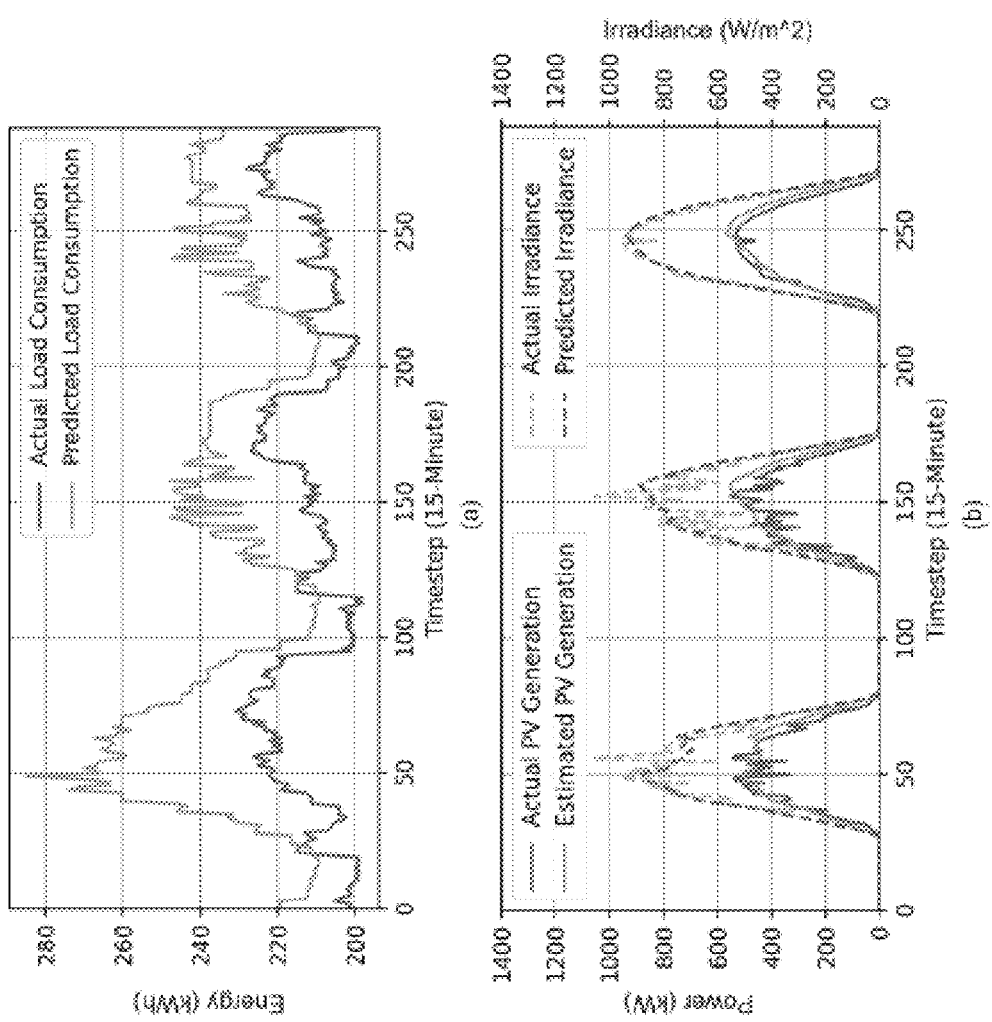
FIGS. 6(a)-6(b) show time-series comparisons between actual and predicted data for load consumption, PV generation, and solar irradiance over a three-day interval.

The load consumption forecasting dataset is obtained through the combined collection of electrical consumption measurements recorded by a metering device installed at the FIU Engineering Campus and meteorological data acquired from a local weather monitoring station. Thus, the dataset comprises 52,795 records of kWh consumption measured at 15-minute intervals, together with corresponding ambient temperature data, representing a continuous recording period exceeding two years. Feature engineering is performed on the base dataset to derive additional input variables, including hour of the day, day of the week, month, and a binary indicator distinguishing between weekday and weekend. This approach is consistent with established methodologies previously described in the field. For the load consumption forecasting regression tree model, the loss function is computed using a squared error metric. The depth of the regression tree is left unconstrained, as the histogram-based best-split process maintains optimal performance and computational efficiency even when applied to large datasets. Final error metrics resulting from the testing of the PV generation and load consumption forecasting models are presented in FIG. 18. Moreover, actual and predicted results for both the load consumption forecasting model and the PV generation forecasting model over a three-day period are illustrated in FIGS. 6(a)-6(b), respectively. In the case of PV generation forecasting, as previously described, irradiance is predicted using the trained Support Vector Machine (SVM) forecasting model, and power output is subsequently estimated in accordance with Equation (1).

In order to predict the number of electric power outages within a specified geographical region, a hybrid machine learning architecture combining an LSTM and a CNN is employed. The model integrates time-series weather data and spatial radar imagery as input features to capture both temporal and spatial correlations associated with outage events. The CNN sub-network extracts spatial features from the radar images, while the LSTM sub-network captures temporal dependencies from the forecasted weather data. The outputs of the LSTM and CNN are fused and processed through one or more fully connected layers to generate a numerical prediction of the expected number of outages within a predefined geographical region.

An RB method is employed to determine whether reactive (unintentional) islanding or proactive (intentional) islanding of a microgrid is required, wherein the method calculates the charge requirements for a BESS by utilizing forecasted grid outage durations and estimated critical load demands, and further monitors grid status and weather conditions to inform the decision-making process. The available energy in the BESS is determined based on the current SOC and the total energy capacity of the battery. If the available energy is found to be insufficient to meet the required energy threshold, the system issues a charge command to increase the SOC before the anticipated outage occurs.

A BESS dispatch profile is generated using forecasted PV generation, load consumption, and variable day-ahead energy market prices through the MILP approach. MILP is an optimization technique that extends conventional linear programming by permitting decision variables to assume both integer and continuous values. This flexibility renders MILP well-suited for addressing complex optimization problems involving discrete decision variables. The general form of a MILP problem is expressed as shown in Equation (3).

$$\text{Minimize } c^T x$$

$$\text{Subject to } Ax \leq b$$

$$x_i \in \mathbb{Z} \text{ for } t \in I$$

$$x_j \in \mathbb{R} \text{ for } j \in J \quad (3)$$

where x is the vector of decision variables comprising both integer and continuous variables; c is the vector of coefficients defining the objective function; A is the matrix of coefficients associated with the constraints; b is the vector of constants in the constraints; I denotes the set of indices corresponding to integer variables; and J denotes the set of indices corresponding to continuous variables.

The objective function $c^T x$ represents a linear combination of the decision variables, which is subject to minimization or maximization, depending on the specific formulation of the optimization problem. The constraints $Ax \leq b$ define a system of linear inequalities that the decision variables must satisfy in order to constitute a feasible solution to the optimization problem. The sets I and J specify the indices of the decision variables in x that are constrained to assume integer values and continuous values, respectively.

Applying this formulation to the BESS dispatch scheduling problem, the corresponding objective function and associated constraints are incorporated as defined in Equations (4)-(11):

$$\text{Minimize} \sum_{t=1}^{T} (p_{grid}(t) \cdot P_{grid}(t)) \quad (4)$$

$$P_{PV}(t) + P_{BESS}^{Dch}(t) + P_{grid}(t) = P_{load}(t) + P_{BESS}^{Ch}(t) \forall\ t \quad (5)$$

$$SOC_{LL} \leq SOC(i) \leq SOC_{UL} \quad (6)$$

$$P_{grid}^{min} \leq P_{grid}(t) \leq P_{grid}^{max} \quad (7)$$

$$P_{BESS}^{Ch}(t) \leq P_{BESS}^{MaxCh} \times S_{BESS} \quad (8)$$

$$P_{BESS}^{Dch}(t) \leq P_{BESS}^{MaxDch} \times S_{BESS} \quad (9)$$

$$S_{BESS} \in \{0, 1\} \quad (10)$$

$$P_{PV}(t), P_{BESS}^{Ch}(t), P_{BESS}^{Dch}(t), P_{load}(t), P_{grid}(t) \geq 0\ \forall\ t \quad (11)$$

In this formulation, T denotes the total number of time steps within the evaluation period. The variable $p_{grid}(t)$ represents the electricity price at time step t, while $P_{grid}(t)$ denotes the power exchanged with the electrical grid, i.e., the power imported from or exported to the grid, at time t. The variable $P_{PV}(t)$ corresponds to the power generated by the PV modules at time t. The variables $P_{BESS}^{Dch}(t)$ and $P_{BESS}^{ch}(t)$ represent the discharge and charge power of the BESS, respectively, at time t. The term $P_{load}(t)$ denotes the power consumed by the electrical loads at time t. The SOC of the BESS at time t is represented by SOC(t) with $SOC_{LL}$ and $SOC_{UL}$ denoting the lower and upper SOC limits, respectively. The parameters $P_{grid}^{min}$ and $P_{grid}^{max}$ define the minimum and maximum power limits for bidirectional power flow with the grid. Likewise, $P_{BESS}^{MaxDch}$ and $P_{BESS}^{Maxch}$ indicate the maximum allowable discharge and charge power for the BESS. The binary variable $S_{BESS}$ indicates the charging status of the BESS, where a value of 1 signifies that the battery is charging, and a value of 0 indicates otherwise.

Equation (4) defines the objective function, which is formulated to minimize the total cost of electricity over the evaluation period. Equation (5) imposes a power balance constraint, ensuring that the sum of generated, consumed, and exchanged power remains in equilibrium throughout the system. Equation (6) establishes bounds on the SOC of BESS, thereby preventing or inhibiting overcharging or excessive discharging, both of which may adversely affect battery performance and operational lifespan. Equation (7) constrains the power exchange with the electrical grid by imposing upper and lower limits on the amount of power that may be imported from or exported to the grid. Equation (8) restricts the battery charging power in accordance with the maximum allowable charging rate, modulated by a binary variable that represents the charging state of the BESS. Equation (9) constrains the battery discharging power in accordance with the maximum allowable discharging rate, modulated by the binary variable indicating the charging state of the BESS. Equation (10) restricts the binary variable representing the charging state of the BESS to assume values of either 0 or 1, where a value of 1 denotes that the BESS is in a charging state, and a value of 0 indicates non-charging state. Equation (11) imposes non-negativity constraints on all power variables to ensure physical feasibility of the solution.

The objective of the formulation is to minimize the total cost of electricity for the end user. Accordingly, the MILP model implements a retail arbitrage strategy whereby: (1) the BESS is charged during periods of low electricity price, $p_{grid}(t)$, typically corresponding to off-peak hours, thereby minimizing the cost associated with energy storage; (2) the BESS discharges during periods of high electricity prices to supply the load or export surplus energy to the grid; and (3) PV generation, $P_{PV}$, is utilized either to meet the load demand directly, to charge the BESS, or to export energy to the grid when economically beneficial.

Figure 3:
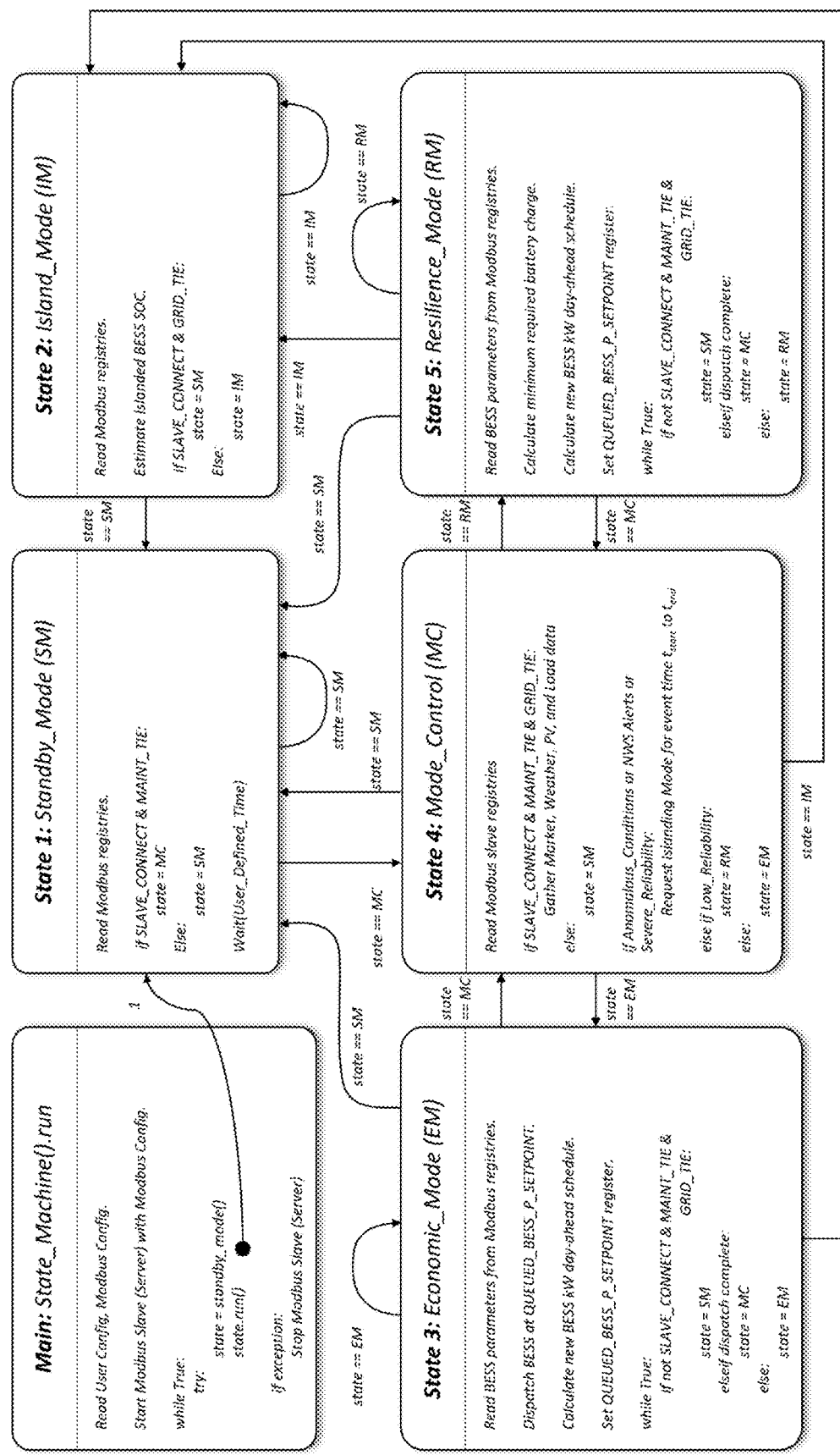
FIG. 3 shows a state-machine architecture of the BESS dispatch scheduling algorithm, according to an embodiment of the subject invention. Each state block comprises a textual description of the corresponding state, incorporating conditional logic expressed through if-then-else statements and iterative logic via while-statements.
Figure 14:
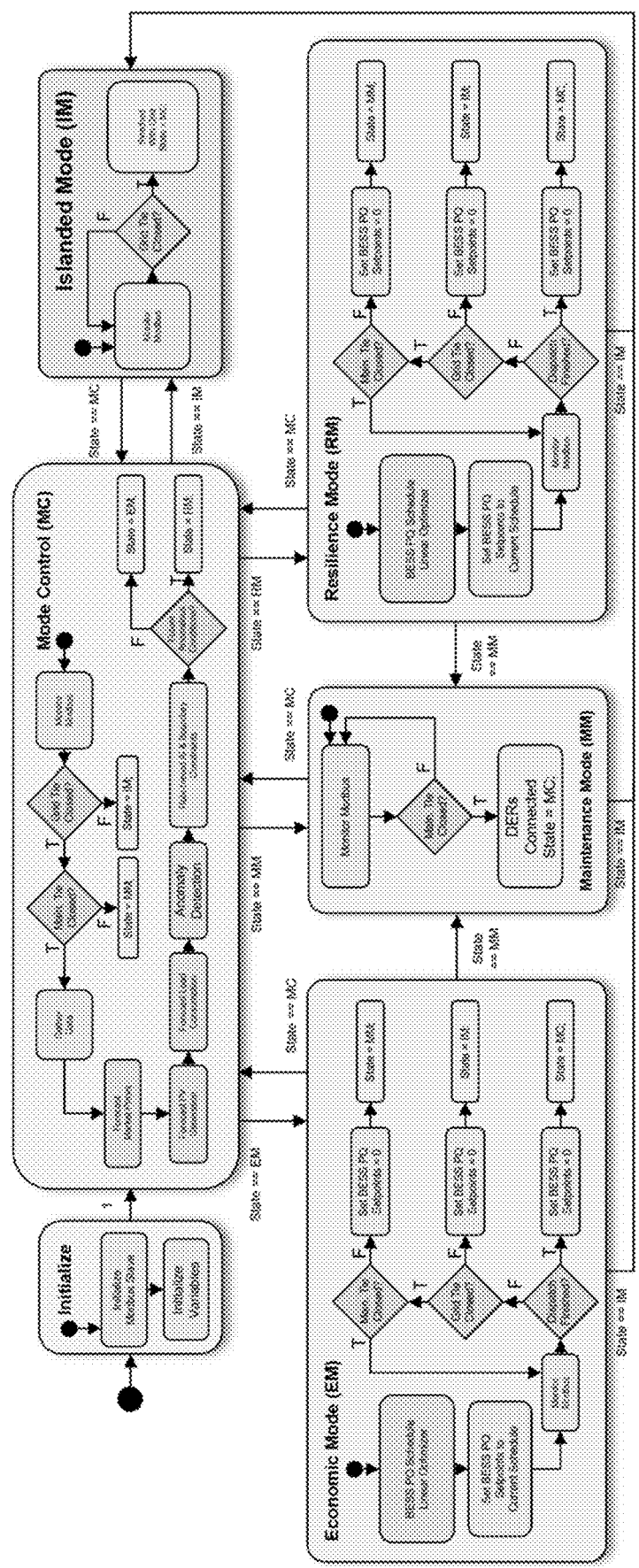
FIG. 14 shows a state-machine architecture of the BESS dispatch scheduling algorithm, according to an embodiment of the subject invention. Each state block comprises a flowchart description of the corresponding state, incorporating conditional logic expressed through if-then-else statements and iterative logic via while-statements.

FIGS. 3 and 14 show a state-machine architecture for the BESS dispatch scheduling algorithm. The state-machine architecture constitutes a design methodology in which system operation is divided into a finite number of discrete states, which transitions between states triggered by specified inputs or events. For code execution, the state-machine architecture is implemented to generate site-specific PV generation, load consumption, and outage forecasts based on local weather conditions, with such forecasts produced periodically according to user input. Furthermore, the collected weather data is utilized by a separate anomalous condition detection model configured to identify conditions warranting microgrid system hardening.

Upon detection of anomalous conditions or NWS alerts in the area, the BESS dispatch prioritizes conservation of stored energy to meet the anticipated load during the anomaly duration. When the forecasted reliability falls below a predefined threshold, a proactive islanding trigger is initiated to alert grid operators and the microgrid control system of the impending intentional islanding operation. The described trigger ensures that secondary and primary controllers can respond appropriately, while providing grid operations with advanced notice to maintain system stability.

If no anomalous conditions are detected, the BESS dispatches to maximize economic return while accounting for the SOC over a user-defined time horizon up to seven days ahead. The BESS discharges or charges according to resilient or economic operation until the next user-defined time block, at which point the process repeats.

Upon the reliability score exceeding a predefined threshold, a proactive islanding trigger is initiated to alert grid operators and the microgrid control system of the impending intentional islanding operation. The described trigger ensures that secondary and primary controllers can respond appropriately, while providing grid operations with advanced notice to maintain system stability.

Figure 4:
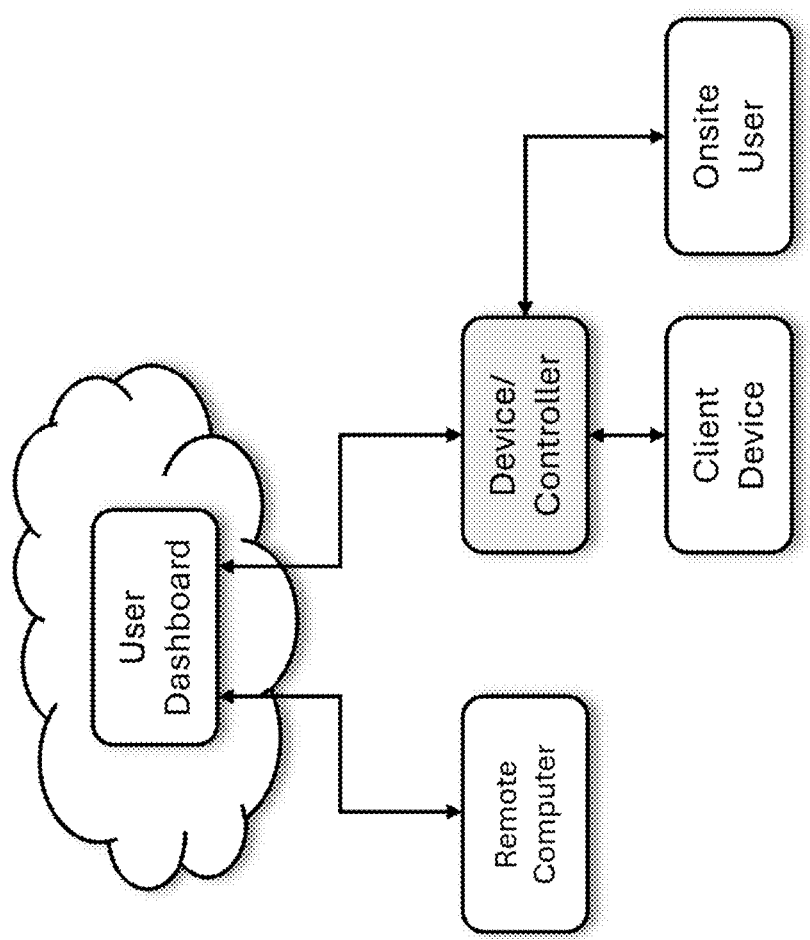
FIG. 4 shows a high-level overview of a prototype device is presented, according to an embodiment of the subject invention. The prototype device refers to a controller device implemented within the microgrid control system, configured to execute embedded software, manage communication with external components, and facilitate the exchange of operational parameters with an external site.

FIG. 4 shows a high-level overview of a prototype device is presented, describing how the prototype device manages communication and control tasks within the microgrid. The prototype device refers to a controller device implemented within the microgrid control system, configured to execute embedded software, manage communication with external components, and facilitate the exchange of operational parameters with an external site as well as to monitor and manage the distribution and flow of electrical power among various energy sources and loads. The controller device communicates with downstream client devices, including PLCs, microgrid secondary controllers, and other devices accessing to operational site data relevant to the controller's operation. The device is further connected to a cloud-based application configured to provide insights accessible to remote users for monitoring and review. Moreover, the device is accessible on-site, allowing users to visualize operational data and modify device settings.

Figure 5:
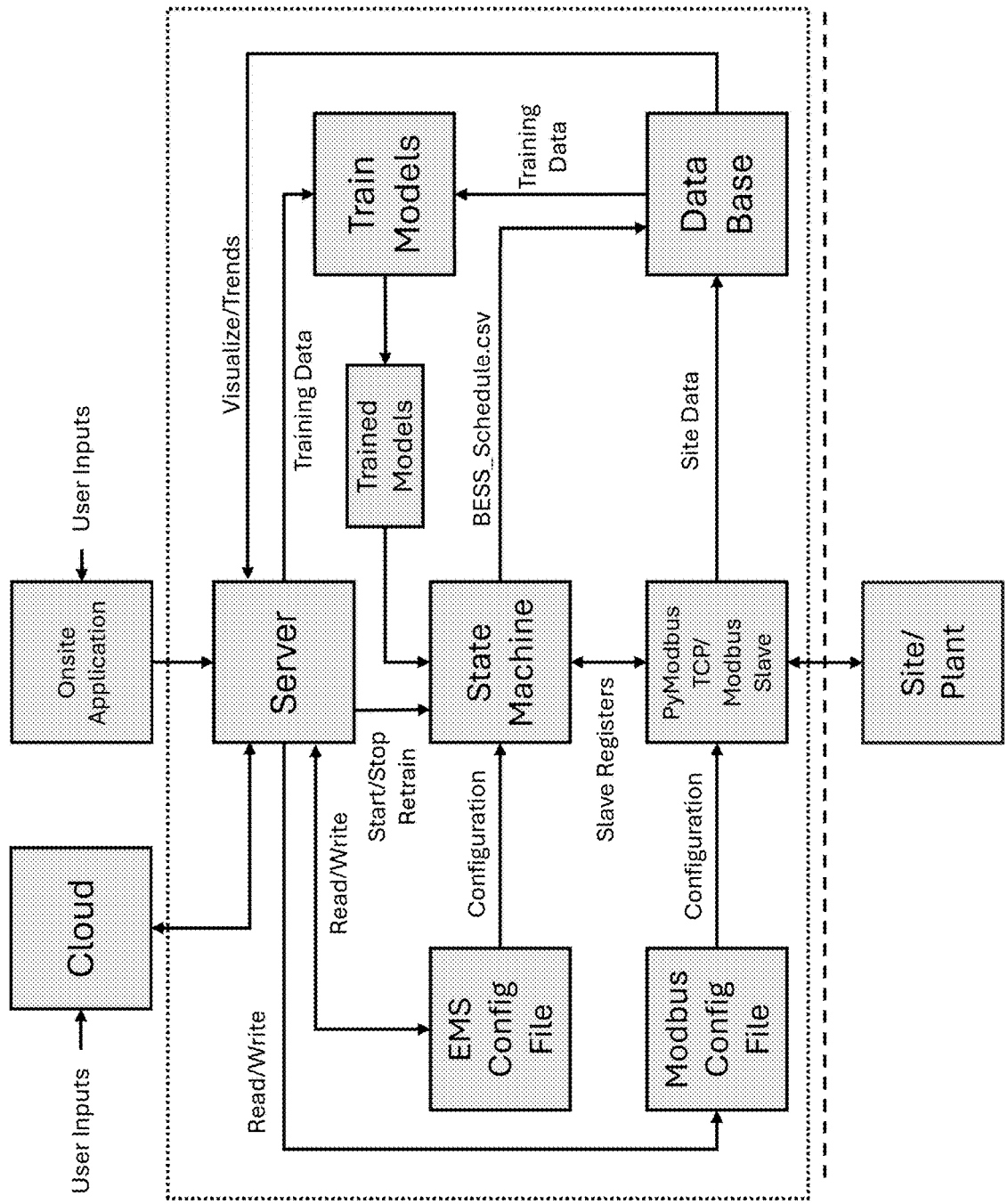
FIG. 5 shows a software architecture corresponding to an implemented prototype device, according to an embodiment of the subject invention.

FIG. 5 illustrates a software architecture corresponding to an implemented prototype device. As shown within the dotted box, embedded code is executed on the device. A backend server is implemented and configured to manage a plurality of functions, including executing Python scripts and facilitating communication between user-interactive applications and the backend code of the controller device. The backend server manages a plurality of configuration files and stores a plurality of trained ML models. The communication interface can transmit and receive operational parameters to and from client devices via a Modbus protocol, enabling bidirectional communication within the system. A database can store operational parameters generated by the controller device, enabling visualization through user interfaces or monitoring tools.

Figure 16:
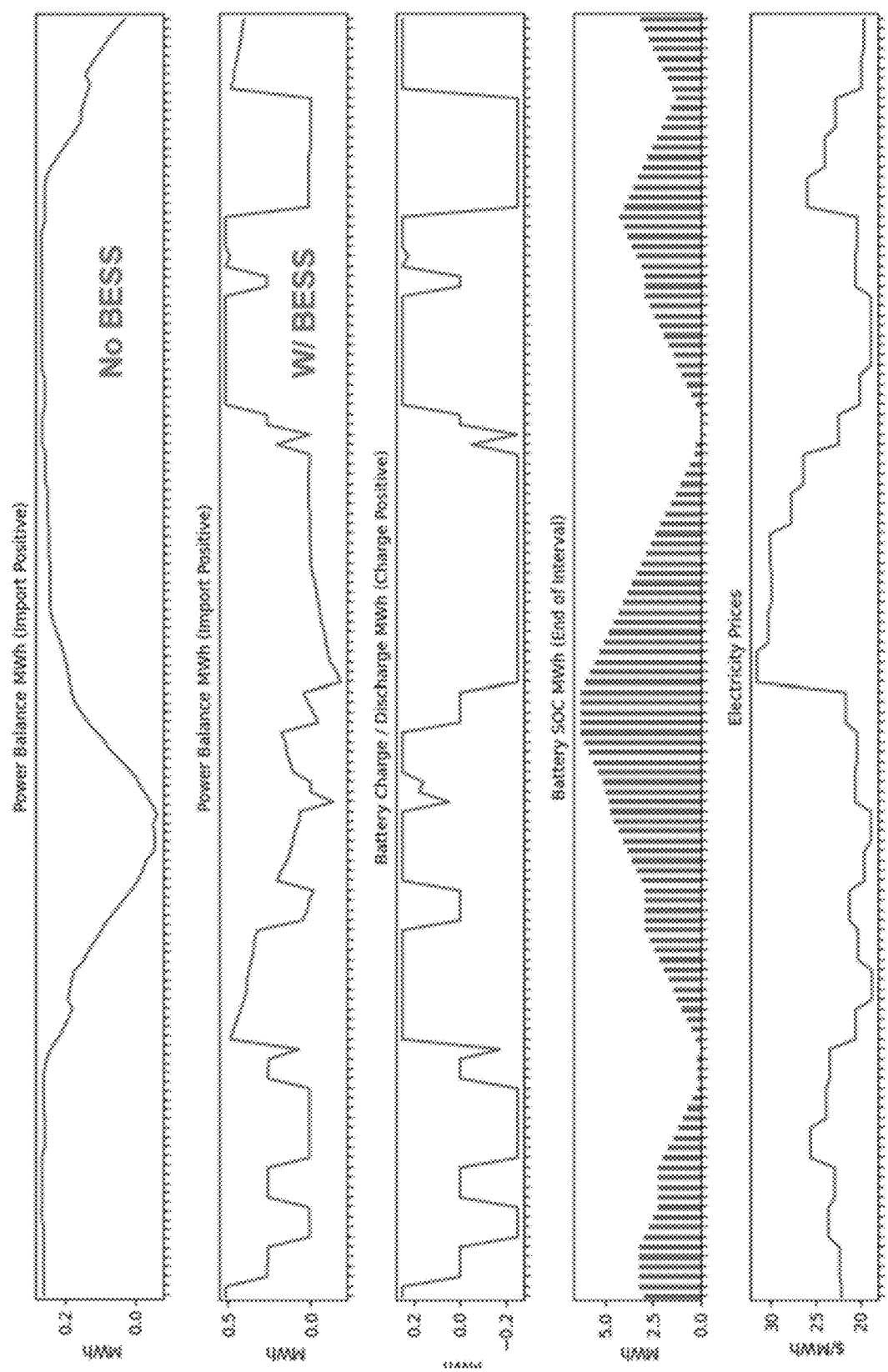
FIG. 16 shows power balance without BESS, power balance with BESS, ratio of battery charge to discharge, battery SOC, and electricity prices.

FIG. 16 shows five vertically aligned line and bar plots that analyze the impact of a BESS on power balance and electricity cost over time. The first plot, labeled "Power Balance MWh (Import Positive)" without BESS, shows the amount of electricity imported from the grid. It depicts a generally smooth curve that begins at a relatively high import level, dips to near zero in the middle period, then rises again before tapering off slightly. The second plot, also labeled "Power Balance MWh (Import Positive)," reflects the scenario with BESS in operation. Compared to the first plot, it exhibits a more irregular and jagged pattern, with noticeably reduced import levels during the high demand periods, indicating that the BESS is supplying some of the required energy. The third plot, labeled "Battery Charge/Discharge MWh (Charge Positive)," shows when the battery is charging and discharging. Positive values indicate charging, and negative values indicate discharging. The pattern reflects strategic charging during low-demand or low-price periods and discharging during high-demand or high-price intervals. The fourth plot shows the "Battery SOC MWh (End of Interval)," representing the SOC of the battery over time. The battery charge increases during early intervals, peaks in the middle, then gradually decreases, indicating a full operational cycle of charging and discharging. The final plot shows "Electricity Prices" in $/MWh. The prices fluctuate throughout the period, with a notable spike around the middle. The charging and discharging behavior of the battery correlates with these price changes, suggesting economic optimization to minimize electricity costs. Overall, the figure illustrates how the integration of a BESS system smooths out power imports, utilizes storage during low-cost periods, and discharges during high-cost periods to optimize energy use and cost efficiency.

Embodiments of the subject invention provide a focused technical solution to the focused technical problem of how to schedule resilient dispatch of a BESS utilizing AI and data-driven forecasting models. The solution is provided by a plurality of data-driven ML models integrated with an MILP approach for a BESS dispatch scheduling algorithm, which leverages location-specific weather data to forecast PV generation, load consumption, and grid outages, in combination with market data. Embodiments of the subject invention provide the technology specific practical application of enabling proactive islanding, thereby improving resilience by maintaining continuous power supply during grid disturbances, minimizing downtime by reducing disruption duration, enhancing grid stability by preventing sudden disconnections. Additionally, embodiments of the subject invention can enhance consumer cost recovery via energy arbitrage.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

When the term module is used herein, it can refer to software and/or one or more algorithms to perform the function of the module; alternatively, the term module can refer to a physical device configured to perform the function of the module (e.g., by having software and/or one or more algorithms stored thereon).

When ranges are used herein, combinations and subcombinations of ranges (including any value or subrange contained therein) are intended to be explicitly included. When the term "about" or "approximately" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Example 1

Real-time Controller Hardware-In-The-Loop (CHIL) simulation facilitates the validation of control algorithms within a high-fidelity simulated environment, offering a cost-effective approach that accelerates development timelines, reduces overall development expenditures, and mitigates potential safety risks to personnel and physical assets. Thus, CHIL simulation is identified in IEEE Standard 2030.8-2018 as a recommended methodology for pre-implementation testing of microgrid control systems. The control algorithm is executed within a real-time simulated environment over a 72-hour evaluation period, enabling comprehensive performance assessment and functional validation of the control strategy.

Real-Time Simulation Hardware:

The hardware environment employed for real-time CHIL simulation comprises two Raspberry Pi 4B microcontroller units, an OP5700 real-time simulator manufactured by OPAL-RT Technologies, and an Ethernet switch to facilitate communication between system components. The first Raspberry Pi 4B device, designated as "RASP PI 1," is configured to execute software implementing the Modbus communication protocol, which is responsible for facilitating data exchange between the MILP-based dispatch algorithm and the simulated grid-tied microgrid environment. This first microcontroller functions as a surrogate microgrid PLC implementing secondary-level control responsibilities and is primarily tasked with facilitating communication acting as a Modbus client (Master) between the upper-level control system (real hardware) and lower-level control system (simulated power system). This microcontroller performs no additional protection, monitoring, or energy management functions beyond the designated communication role. The second Raspberry Pi 4B, designated as "RASP PI 2," is configured to execute the MILP-based BESS dispatch scheduling algorithm and to operate as a Modbus server (Slave), supplying dispatch control setpoints to the surrogate microgrid PLC. The OP5700 real-time simulator, provided by OPAL-RT Technologies, is employed to simulate a high-fidelity replica of a grid-tied microgrid for the purpose of evaluating the scheduling performance of the algorithm. A 72-hour dataset comprising time-synchronized real-world weather, market pricing, PV generation, and load consumption data is provided to both the MILP-based BESS dispatch scheduling algorithm and the simulated power system environment, as applicable.

Latency measurements were conducted by transmitting 20 ping requests to evaluate communication delays between the system components. The connection latency between the Modbus broker hosted on the first Raspberry Pi 4B device ("RASP PI 1") and the MILP-based dispatch algorithm executing on the second Raspberry Pi 4B device ("RASP PI 2") was observed to range from 0.307 milliseconds (ms) to 0.407 ms, with an average latency of approximately 0.361 ms. In contrast, the latency measured between the Modbus broker and the OP5700 real-time simulator ranged from 0.186 ms to 0.263 ms, with an average latency of approximately 0.220 ms.

Figure 7:
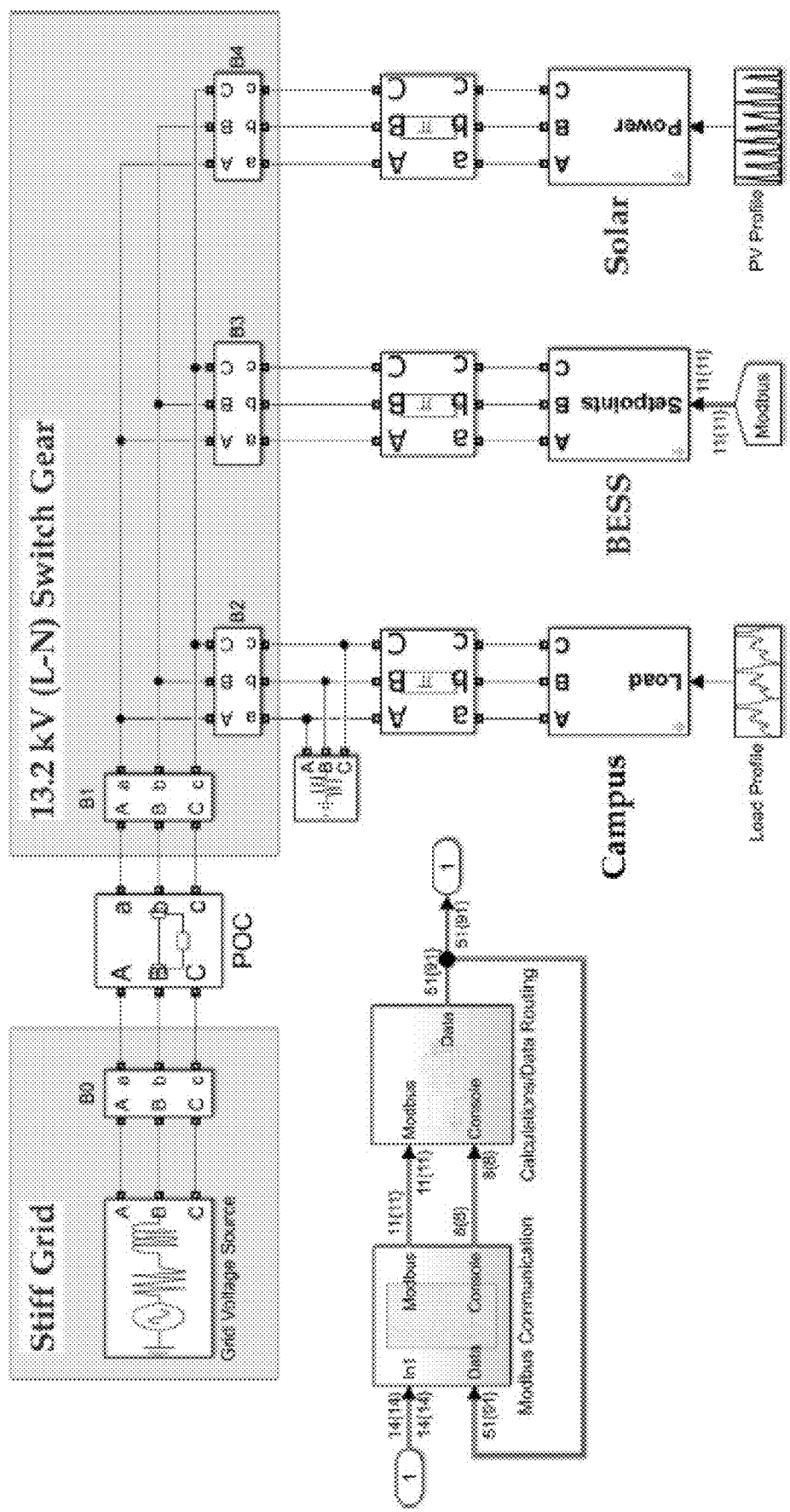
FIG. 7 shows a simulation model implemented using the MATLAB and Simulink platforms representing the Florida International University (FIU) Engineering Campus microgrid comprising a PV canopy rated at approximately 1.4 megawatts direct current (MWDC) and 1.1 megawatts alternating current (MWAC), a BESS having an energy capacity of approximately nine megawatt-hours (MWh) and a power rating of three megawatts (MW), and an associated building electrical load, characterized by an average campus demand of approximately 1 MW.

System Model and Event Modeling:

The electrical system under consideration is based on an operational renewable power plant microgrid located at the FIU Engineering Campus and is modeled using Simulink within MATLAB environment. This microgrid comprises a PV canopy rated at approximately 1.4 megawatts direct current (MWDC) and 1.1 megawatts alternating current (MWAC), a BESS having an energy capacity of approximately nine megawatt-hours (MWh) and a power rating of three megawatts (MW), and an associated building electrical load, characterized by an average campus demand of approximately 1 MW. Notwithstanding the BESS's rated power capacity of 3 MW, for purposes of HIL testing and economic analysis, the maximum power output of the BESS is constrained to 1 MW. Additionally, the system incorporates a sufficiently stiff grid characterized by a reactance-to-resistance ratio (X/R) greater than 7 to emulate a grid-connected condition, and 3-phase line lengths of 0.1 kilometers (km) are employed. A microgrid simulation model implemented using the MATLAB and Simulink platforms utilized for the real-time simulation is depicted in FIG. 7.

Figure 8A:
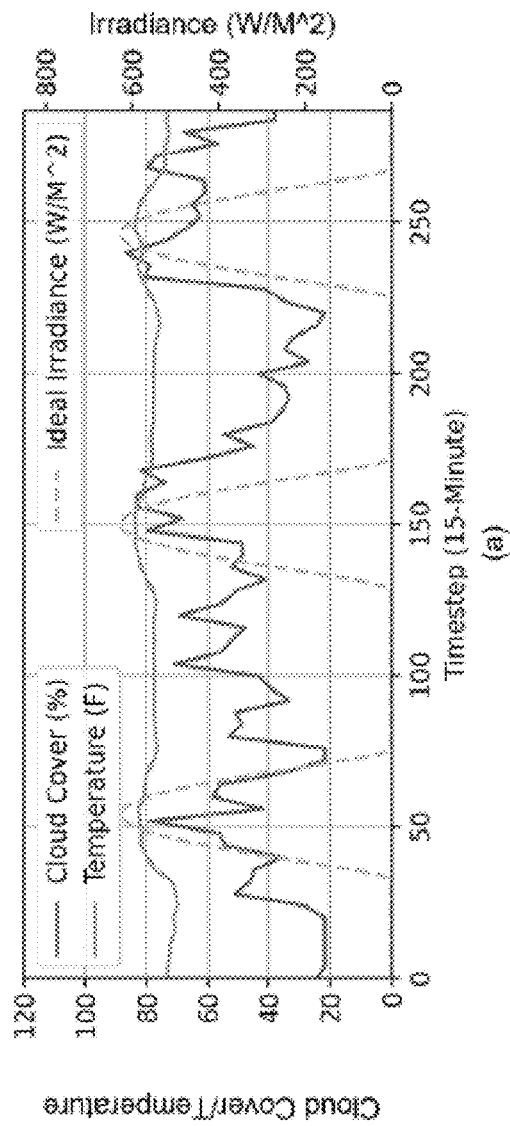
FIGS. 8(a)-8(c) show 72-hour real-time simulation of environmental conditions (e.g., cloud cover, temperature, and ideal irradiance), PV generation, load consumption and electricity market prices, all measured over 15-minute intervals.
Figure 8B:
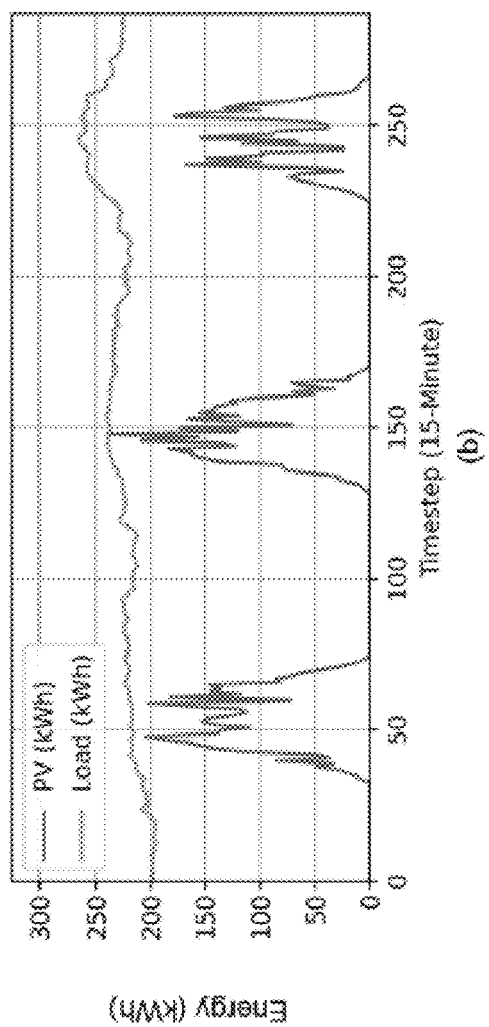

To simulate the forecasted environmental conditions required for the evaluation of the BESS dispatch scheduling algorithm, a 72-hour historical weather forecast dataset is utilized. This dataset includes ambient temperature and cloud coverage data retrieved from the NWS API, in addition to the computed ideal solar irradiance values for Miami, Florida. The weather data employed in the simulation is illustrated in FIG. 8(a). Furthermore, time-series aligned real-world historical data of solar PV generation and load consumption, collected from the FIU Engineering Campus, is integrated into the simulation to emulate actual operating conditions. The incorporation of the historical PV generation and load consumption data enables the simulation to introduce real-world forecasting inaccuracies, thereby allowing the performance of the scheduling algorithm to be evaluated under realistic uncertainty conditions. The corresponding PV generation and load consumption data are depicted in FIG. 8(b). Finally, historical Locational Marginal Price (LMP) data from PJM market, also time-series aligned, is applied as the economic price signal input to the MILP-based BESS dispatch scheduling algorithm to determine optimal dispatch decisions. The implemented pricing data is presented in FIG. 8(c).

The BESS dispatch scheduling algorithm acquires input data from multiple sources including forecasted weather conditions for the purpose of generating solar PV generation, load consumption, and grid outages forecasts, the BESS SOC, and relevant market pricing information. Based on the collected data, the algorithm computes an optimal dispatch schedule at the beginning of each user-defined time interval configured in this implementation as 15-minute time steps extending to the user-defined scheduling horizon or constrained by the availability of time-series data, whichever is shorter. To mitigate the accumulation of forecasting errors, deviations due to system inefficiencies, and other uncertainties that may results in divergence of the BESS SOC from the projected trajectory over extended durations, the dispatch algorithm is re-executed at the conclusion of each time step.

In the simulation, at the beginning of each time interval, the MILP scheduling algorithm is provided with access to 24-hour ahead weather forecast data and market pricing information. The data is utilized to perform forecasting of PV generation, load consumption, and grid outages and to generate a corresponding BESS dispatch schedule. From the computed schedule, the BESS power setpoint for the subsequent time step, t+1, is extracted and queued for implementation during the next scheduling period. For the purpose of this simulation, the initial BESS SOC is set to 50%, with an upper SOC limit of 90% and a lower SOC limit of 20%. The BESS ramp rate is configured at 600 kW per minute, and both charging and discharging efficiencies are set to 95%. A comprehensive listing of the simulated power system parameters, including those employed in the calculation of Equation (1), is provided in tabular form in FIG. 19.

Figure 8C:
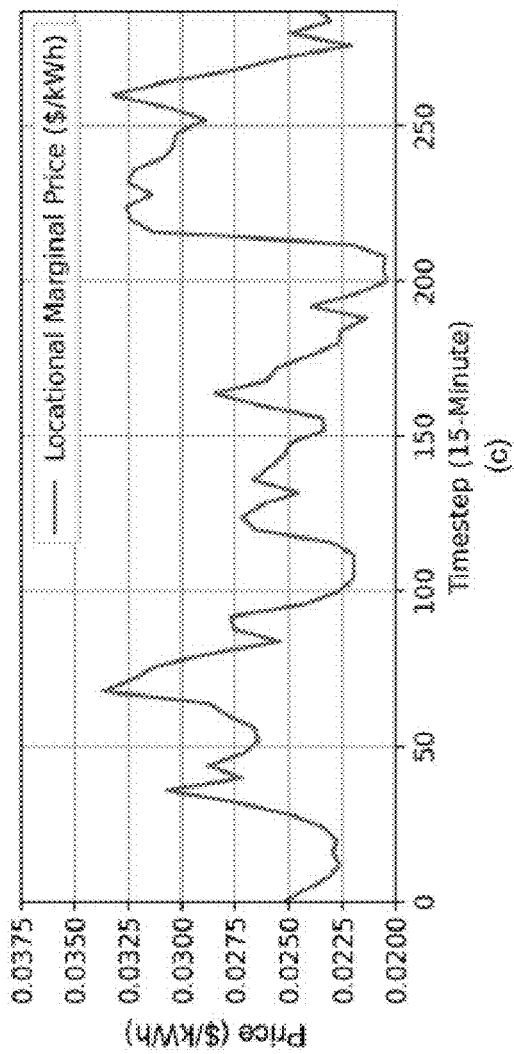
Figure 9:
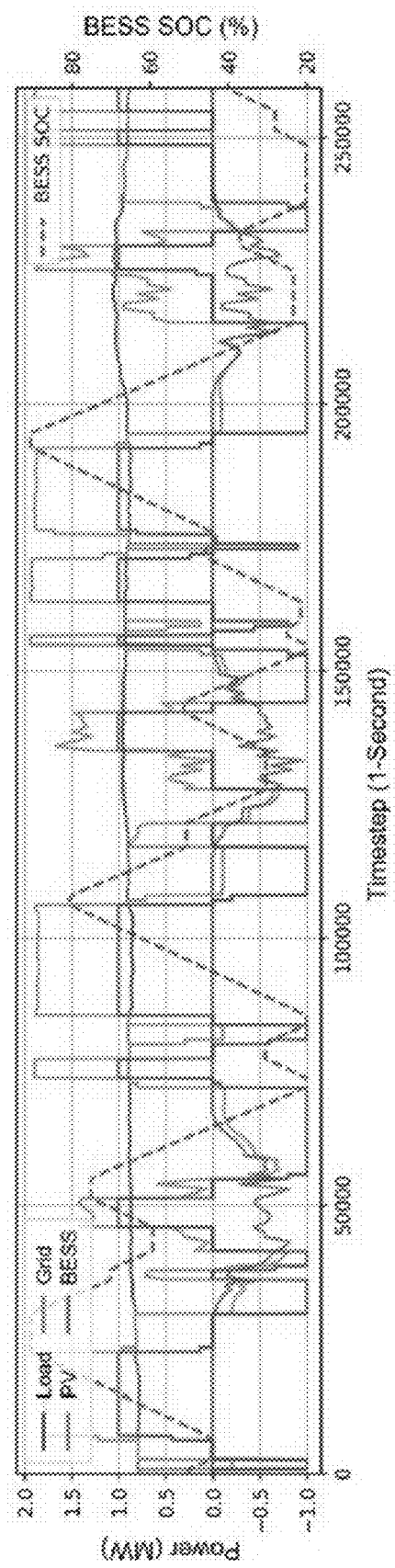
FIG. 9 shows a detailed time-series plot representing the operation of a power system over time, with a resolution of one-second intervals on the x-axis. The primary y-axis on the left side of the graph represents power in MW, while the secondary y-axis on the right side indicates the State of Charge (SOC) of the BESS in percentage (%). Multiple data series are overlaid to illustrate interactions among power sources, consumption, and battery behavior. The plot includes lines representing load consumption, grid power flow, PV generation, and BESS power activity. The load consumption line shows as a relatively stable line, indicating a consistent energy demand throughout the time span. The PV generation line fluctuates slightly, suggesting variability in solar input, though it remains mostly below the load level. The grid power line displays frequent sharp fluctuations, indicating active import from or export to the grid, likely responding to the changing balance between supply and demand. The BESS power line shows frequent shifts between positive and negative values, representing charging (negative values) and discharging (positive values) behavior. Overlaying the power profiles is a dashed line representing the BESS SOC, plotted on the secondary y-axis. This line shows a repeating pattern of increase and decrease, indicating that the battery charges and discharges cyclically. When the SOC increases, it corresponds with the BESS charging (negative power values), and when the SOC decreases, it corresponds with discharging (positive power values).

Simulation Results:

The HIL real-time simulation is executed continuously over 72-hour period to evaluate the operational performance of the MILP-based scheduling controller. The comprehensive simulation results, which include real load consumption, actual PV generation, dispatched BESS power, and grid power exchange, are illustrated in FIG. 9. The results demonstrate that the BESS SOC generally increases during the early morning hours, reaching or approaching the maximum SOC limit prior to initiating strategic discharging operations throughout the daytime hours. This charge/discharge behavior aligns with the dynamic fluctuations in PJM market energy pricing, as depicted in FIG. 8(c), thereby enabling the system to capitalize on price differentials and realize economic gains.

Figure 10A:
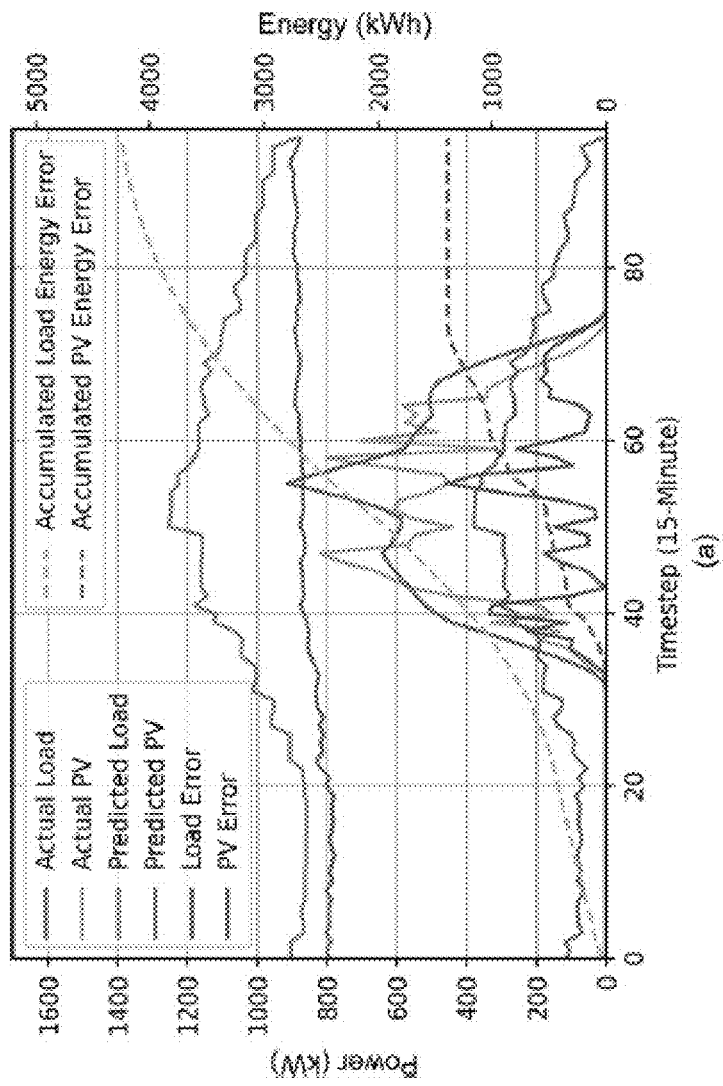
FIGS. 10(a)-10(b) show real-time simulation results.
Figure 10B:
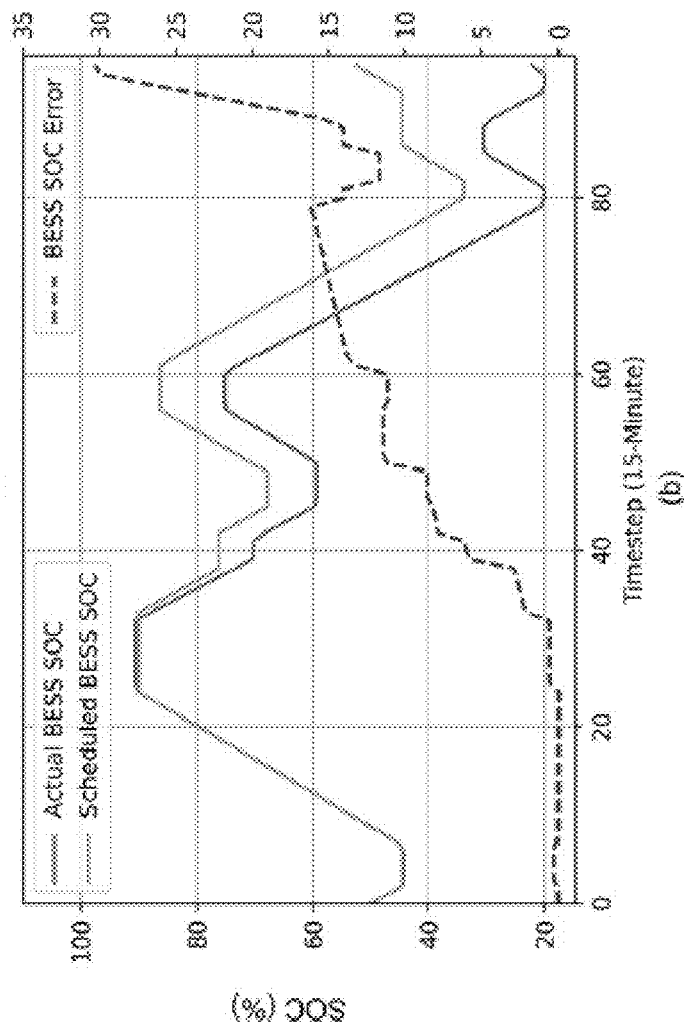

At each 15-minute interval, the MILP-based scheduling algorithm is executed to generate load consumption and PV generation forecasts, as well as to produce the most current 24-hour electricity plan, consistent with the recommendations outlined in IEEE 2030.9-2018. The significance of adhering to this recommendation is illustrated in FIGS. 10(a)-10(b), which compares the projected BESS SOC schedule at time t=0, along with predicted load consumption and PV generation, against the actual measured values recorded subsequently during the simulation. Specifically, FIG. 10(a) demonstrates that forecasting errors for PV generation and load consumption peak during midday hours, with load forecasting errors persisting at a reduced rate during early morning and late evening periods. Depending upon system the system constraints, the overall performance and effectiveness of the controller are influenced by the accuracy of the forecasts. Improvement in forecasting precision is expected to enhance the economic viability of the system further. The MILP-based scheduling incorporates projected generation, load consumption, BESS SOC, and electricity pricing at each time step within the defined scheduling horizon to optimize dispatch decisions subject to system constraints. In this implementation, the observed errors between forecasted and actual values show slight positive bias in the load forecast, indicating that the prediction model may require recalibration to correct for systematic bias. If uncorrected, forecasting inaccuracies both in PV generation and load consumption result in cumulative errors in BESS SOC over time, as illustrated in FIG. 10(b). Such deviations can lead to suboptimal utilization of the BESS, wherein available capacity may not align with the anticipated periods of economic opportunity for energy arbitrage, thereby reducing achievable cost savings. Accordingly, enhancing the accuracy of short-term forecasts, which are updated at each 15-minute interval, presents a viable pathway for improving overall system performance and economic return.

For benchmarking purposes, FIG. 20 shows the minimum, average, and maximum execution times recorded for each stage of the algorithm over five iterative runs. On average, the process of retrieving weather forecast data requires approximately 1.028 seconds, while retrieval of market pricing data requires approximately 2.152 seconds. The PV generation forecasting module executes in approximately 1.471 seconds, and the local forecasting module completes in approximately 0.230 seconds. The MILP optimization procedure responsible for generating the dispatch schedule requires an average of 1.229 seconds to solve. Consequently, the total average execution time for a complete run of the algorithm is approximately 6.110 seconds. Given the constraint that the algorithm must be re-executed at 15-minute intervals, the observed execution time, in combination with previously measured communication latencies of less than 1 ms, satisfies real-time operational requirements. Data acquisition times for weather and market inputs are subject to greater variability due to reliance on third-party APIs and external network conditions. In contrast, execution times associated with the PV generation and load consumption forecasting models, as well as the MILP solver, are relatively stable due to the primary dependence on locally available computational resources. Nonetheless, the execution times may increase in scenarios involving more complex forecasting models or an expanded constraint set within the optimization formulation.

Economic Analysis:

To evaluate the economic viability of the MILP-based BESS dispatch scheduling algorithm, a comprehensive analysis is conducted against an RB BESS scheduling algorithm. Economic viability is characterized by a reduction in the LCOE, thereby offering improved economic justification for the deployment of the system. Accordingly, the performance of each scheduling approach is assessed based on the ability to minimize the system's LCOE.

The LCOE metric, as defined and simplified in Equation (12), is computed in part from the total cost of system components, denoted as $C_c$, which encompasses both installation and operational expenditures, and the electricity consumption cost, $C_e$, divided by the total energy output over the operational lifetime of the system. This formulation enables a quantifiable measure of cost-effectiveness by correlating capital and operational investments to total energy production.

$$LCOE = \frac{C_c + C_e}{\sum_i^t kWh} \quad (12)$$

Figure 11:
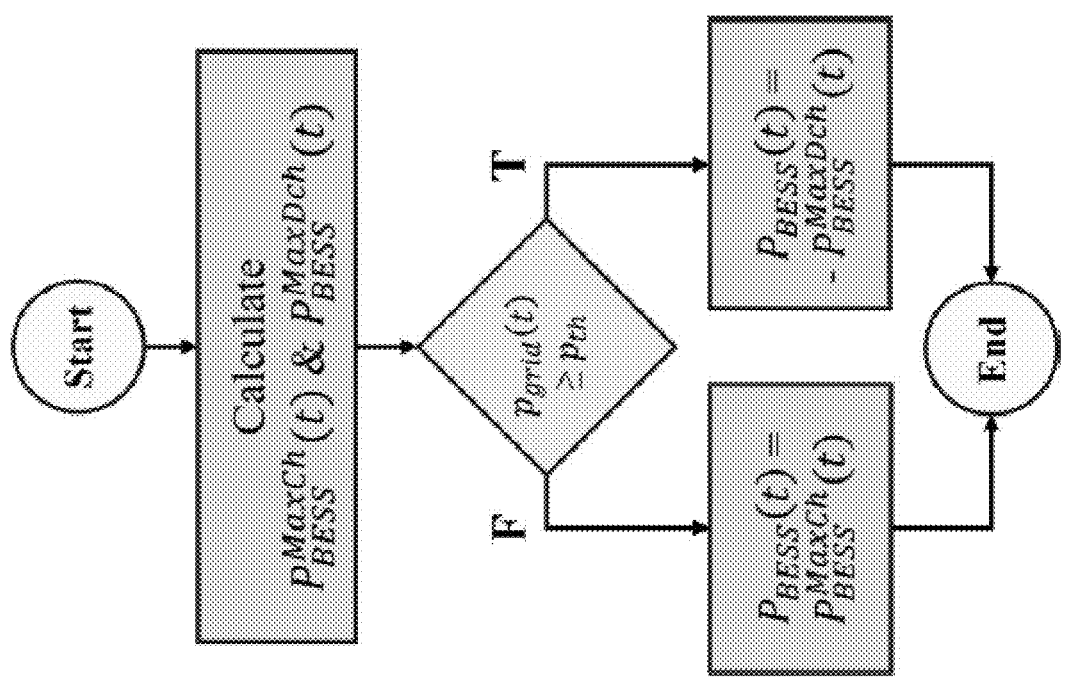
FIG. 11 shows a flowchart of a baseline rule-based (RB) algorithm, according to an embodiment of the subject invention.

The formulas used to calculate the total component cost $C_c$ and the electricity consumption cost $C_e$ are provided in Equation (13) and Equation (14), respectively, $$C_c = \left(PV_{kW\,DC}^{mod} \times CC_{PV}^{mod}\right) + \left(PV_{kW\,AC}^{inv} \times CC_{PV}^{kw}\right) + \quad (13)$$
$$\left(BESS_{kW\,DC}^{inv} \times CC_{BESS}^{inv}\right) + \left(BESS_{kW\,hDC}^{cap} \times CC_{BESS}^{cap}\right)$$

$$C_t = \sum_l^n \left(\sum_l^t (p_{grid}(t) \times p_{grid}(t)) \times \frac{1}{(1+ir)^n}\right) \quad (14)$$

where $PV_{kW\,DC}^{mod}$ denotes the aggregate DC power rating of all PV modules in kW, $PV_{kW\,AC}^{inv}$ denotes the aggregate AC power rating of all PV inverters in kW, $BESS_{kW\,DC}^{inv}$ denotes the aggregate DC power rating in all BESS inverters in kW, and $BESS_{kW\,DC}^{cap}$ denotes the DC energy rating of the BESS in kWh. $CC_{PV}^{mod}$, $CC_{PV}^{inv}$, $CC_{BESS}^{inv}$, and $CC_{BESS}^{cap}$ represent the levelized component costs per unit of kW for PV modules, PV inverters, BESS inverters, and per unit of kWh for BESS energy storage capacity, respectively. The costs include installation, replacement, operational, and maintenance expenses. Parameter n represents the project lifetime in years; $p_{grid}(t)$ is the electricity price or rate structure from the grid at time t; $P_{grid}(t)$ is the total power imported from or exported to the grid at time t; and ir is the interest rate. The right-most term in Equation (14) represents the Net Present Value (NPV) factor, whereby the inner summation corresponds to the NPV of one year of electricity consumption (or generation if exports exceed consumption), and the outer summation accounts for the total NPV over the project lifetime. By reducing $C_e$, system LCOE is effectively reduced, thereby enhancing the economic viability of the plant. Therefore, the MILP-based scheduling algorithm is evaluated using one year of historical data from the FIU Engineering Campus to estimate the hypothetical reduction in $C_e$, and consequently LCOE, for the system. Furthermore, the algorithm is benchmarked against an RB scheduling algorithm serving as a baseline, to assess performance under both real TOU and hypothetical LMP rate structure. FIG. 11 shows the RB baseline algorithm implemented to calculate BESS power output, $P_{BESS}(t)$, at each time t.

$p_{grid}(t)$ denotes the price of electricity at time t; $p_{th}$ represents the threshold price used to determine whether the BESS will operate in charging or discharging mode; $P_{Bess}^{MaxCh}(t)$ refers to the maximum allowable BESS charge power at time t; and $P_{Bess}^{MaxDCh}(t)$ denotes the maximum allowable BESS discharging power at time t, as determined by the formulations provided by Equations (15) and (16).

$$P_{BESS}^{MaxCh}(t) = \begin{cases} 0 & p_{grid}(t) \geq p_{th} \\ \min(BESS_{kW\,AC}^{inv}, BESS_E^{ch}) & p_{grid}(t) < p_{th} \end{cases} \quad (15)$$

$$P_{BESS}^{MaxDch}(t) = \begin{cases} \min(BESS_{kW\,AC}^{inv}, BESS_E^{dch}) & p_{grid}(t) \geq p_{th} \\ 0 & p_{grid}(t) < p_{th} \end{cases} \quad (16)$$

where $BESS_{kW\,AC}^{inv}$ represents the rated maximum power output of the BESS inverter, $BESS_E^{ch}$ denotes the remaining available capacity for charging and $BESS_E^{dch}$ denotes the available energy capacity for discharging. Both $BESS_E^{ch}$ and $BESS_E^{dch}$ are determined in accordance with Equations (17) and (18), respectively.

$$BESS_E^{ch} = BESS_{kW\,hDC}^{cap} \times (SOC_{UL} - SOC(t)) \quad (17)$$

$$BESS_E^{dch} = BESS_{kW\,hDC}^{cap} \times (SOC(t) - SOC_{LL}) \quad (18)$$

where $BESS_{KWhAC}^{cap}$ denotes the rated energy storage capacity of the BESS in kWh, SOC(t) represents the BESS SOC at time t, and $SOC_{UL}$ and $SOC_{LL}$ are the user-defined upper and lower limit constraints, respectively, for the allowable SOC range. In summary, the RB scheduling algorithm operates by first calculating the maximum permissible charge and discharge power levels based on available capacity and inverter limits. Then, based on whether the prevailing electricity price signal exceeds od falls below a predefined threshold, the algorithm directs the BESS to either charge or discharge at the maximum allowable rate to optimize economic return.

Input Dataset:

Input parameters utilized for simulating the power systems in the economic analysis are aligned with the parameters employed in the real-time simulation and are illustrated in FIG. 19. For the initial phase of the economic evaluation and comparative analysis, the forecasted PV generation, load consumption, and grid outages are assumed to be as ideal i.e., free of forecasting error. Subsequently, a forecasting error sensitivity analysis is conducted on the MILP-based scheduling algorithm under LMP electricity rate conditions, wherein the maximum allowable grid export capacity is also varied. The historical datasets and electricity pricing structures adopted in these analyses are described in the following subsections.

Historical Campus Data:

The dataset used to perform the economic analysis comprises real historical measurements collected at the FIU Engineering Center over a continuous one-year period. The dataset includes cloud coverage expressed as a percentage, ambient temperature in degrees Fahrenheit, solar PV generation, and campus electrical load. Additionally, ideal solar irradiance is calculated based on the geographic coordinates (longitude and latitude) of the campus and the corresponding time of day.

System Costs and Electricity Rates:

In the economic analysis, two distinct variable energy pricing structures are evaluated. The first pricing structure corresponds to the actual TOU-based electricity rate by the local utility provider. The second pricing structure is derived from day-ahead LMP data published by PJM energy market.

Figures 12A, 12B:
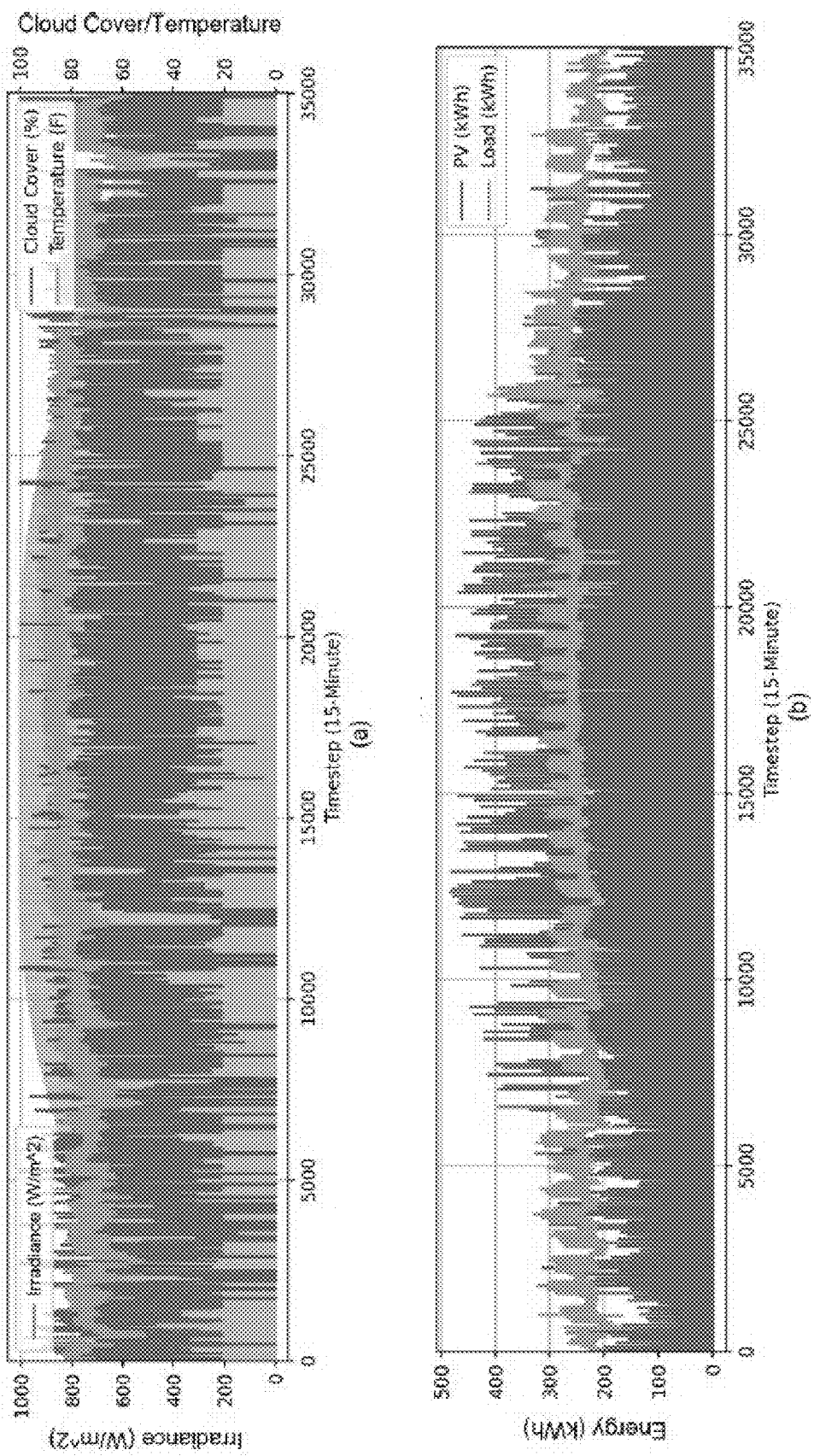
FIGS. 12(a)-12(c) show an economic analysis based on various input data.
Figure 12C:
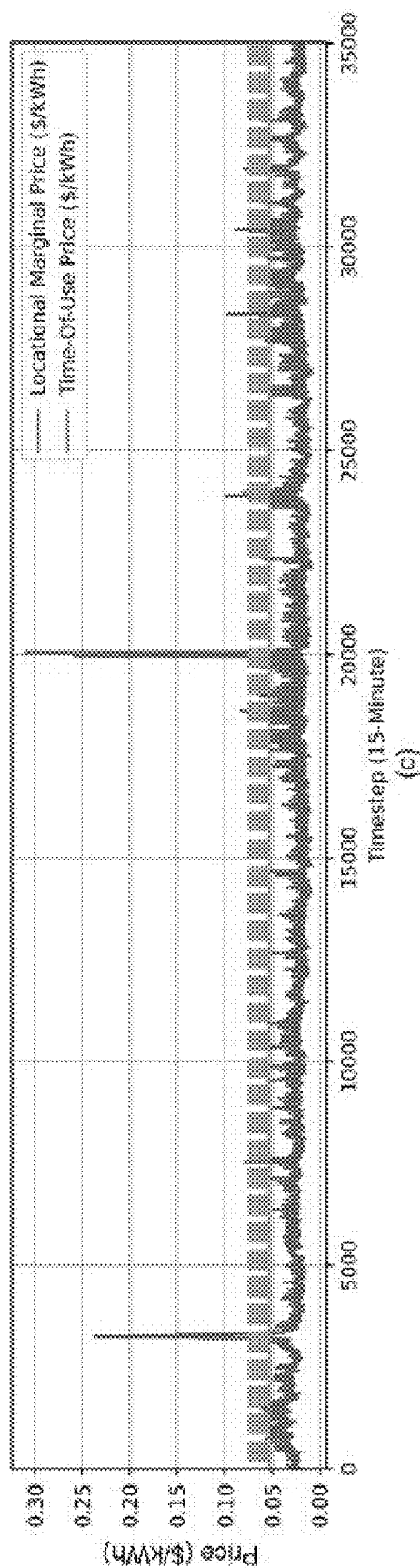

For TOU-based electricity rate, excluding weekends and designated holidays, winter on-peak periods are defined as occurring from November 1 to March 31, between the hours of 6:00 a.m. to 10:00 a.m. and 6:00 p.m. to 10:00 p.m. Summer on-peak periods, spanning from April 1 to October 31 are defined as 12:00 p.m. to 9:00 p.m. All other hours are categorized as off-peak. The energy price is established at 7.413 cents per kWh (¢/kWh) during on-peak hours and 5.277 ¢/kWh during off-peak hours. With respect to LMP-based electricity rate, the analysis utilizes data from PJM corresponding to Price Node ID: 48592 and Zone: PSEG. The complete dataset employed in the analysis is graphically presented in FIGS. 12(a)-12(c). For cases involving LMP-based electricity rate, the calculated median and average LMP electricity prices are 2.3195 ¢/kWh and 2.5110 ¢/kWh, respectively. These values are employed as the pricing threshold ($p_{th}$) for the RB control scheme to determine BESS charging and discharging decision. LMP rates are considerably lower than the TOU rates, as rates reflect wholesale electricity pricing rather than residential or retail electricity pricing. Nonetheless, the LMP rate is considered sufficient for evaluating scheduling performance under wholesale market conditions.

The system sizes are implemented are as follows: The aggregate DC power rating of all PV modules, $PV_{kW\,DC}^{mod}$, is set as 1,400 kW DC. The aggregate AC power rating of all PV inverters, $PV_{kW\,DC}^{inv}$, is set as 1,100 kW AC. The DC power rating of the BESS inverter $BESS_{kW\,DC}^{inv}$ is set as 3,000 kW DC. The DC energy rating of the BESS, $BESS_{kW\,hDC}^{cap}$, is set as 9,000 kWh DC. The approximate levelized components costs, adapted from National Renewable Energy Laboratory (2024), are $1626.40/kW DC for PV modules ($CC_{PV}^{mod}$), $53.50/kW AC for PV inverters ($CC_{PV}^{inv}$), $508.85/kW DC for BESS inverters ($CC_{BESS}^{inv}$), and $240.81/kWh DC for BESS energy capacity ($CC_{BESS}^{cap}$). Utilizing Equation (13), the total cost of the PV components is calculated as $2,335,810, the total cost of battery components as $3,693,840, resulting a total system cost ($C_c$) of $6,029,650. An interest rate (ir) of 3% and a project length (n) of 25 years are also assumed. This data forms the basis for calculating the final LCOE for each BESS scheduling algorithm scenario.

Economic Results:

Both the MILP-based scheduling algorithm and a baseline RB algorithm are evaluated using one year of historical data collected from the FIU Engineering Campus in order to assess the reduction in electricity consumption cost ($C_e$), and the corresponding reduction in LCOE. The values of $C_e$ and LCOE are calculated for the FIU Engineering Campus using Equations (12) and (14), respectively, under the following five system configurations:

Case 1: no PV generation and no BESS installed.
Case 2: a 1.4 MW DC PV generation system is installed; no BESS is utilized.
Case 3: a 1.4 MW DC PV generation system is installed and a 9 MWh/3 MW BESS is integrated but operated solely for backup power purposes.
Case 4: a 1.4 MW DC PV generation system is installed with a 9 MWh/3 MW BESS scheduled using an RB algorithm.
Case 5: a 1.4 MW DC PV generation system is installed with a 9 MWh/3 MW BESS scheduled using the MILP-based algorithm.

A summary of the evaluated system configuration cases is presented in FIG. 21(a). The corresponding results for each configuration including the calculated total component cost ($C_c$), electricity consumption cost ($C_e$), LCOE, and the percentage reduction in LCOE are provided in FIG. 21(b)

and FIG. 21(c) for both TOU and LMP electricity pricing scenarios, respectively, over a one-year evaluation period.

As illustrated, under both TOU and LMP energy pricing scenarios, the integration of solar PV generation markedly reduces the electricity consumption cost ($C_e$) compared to baseline configurations without supplemental generation (Cases 1 and 3). In the TOU pricing scenario, when BESS scheduling is employed, the RB scheduling approach yields a 6.00% reduction in LCOE relative to the PV-only configuration (Case 2), while the MILP-based scheduling approach achieves a 5.32% reduction. Under the LMP pricing scenario, RB scheduling yields LCOE reductions of 3.12% and 3.20% when applying median and average LMP price thresholds, respectively. In contrast, the MILP-based scheduling approach delivers a 7.27% reduction in LCOE, demonstrating superior economic performance over the baseline RB method in the LMP scenario. In Case 7, as shown in FIG. 21(c), the calculated LCOE increases significantly due to the use of commercial-level component costs ($CC_{PV}^{mod}$ and $CC_{PV}^{inv}$) for computing $C_c$, while the electricity cost $C_e$ is based on wholesale LMP rates. Nevertheless, this case further reinforces the effectiveness of solar PV integration in reducing $C_e$ within the system.

Figures 13A, 13B:
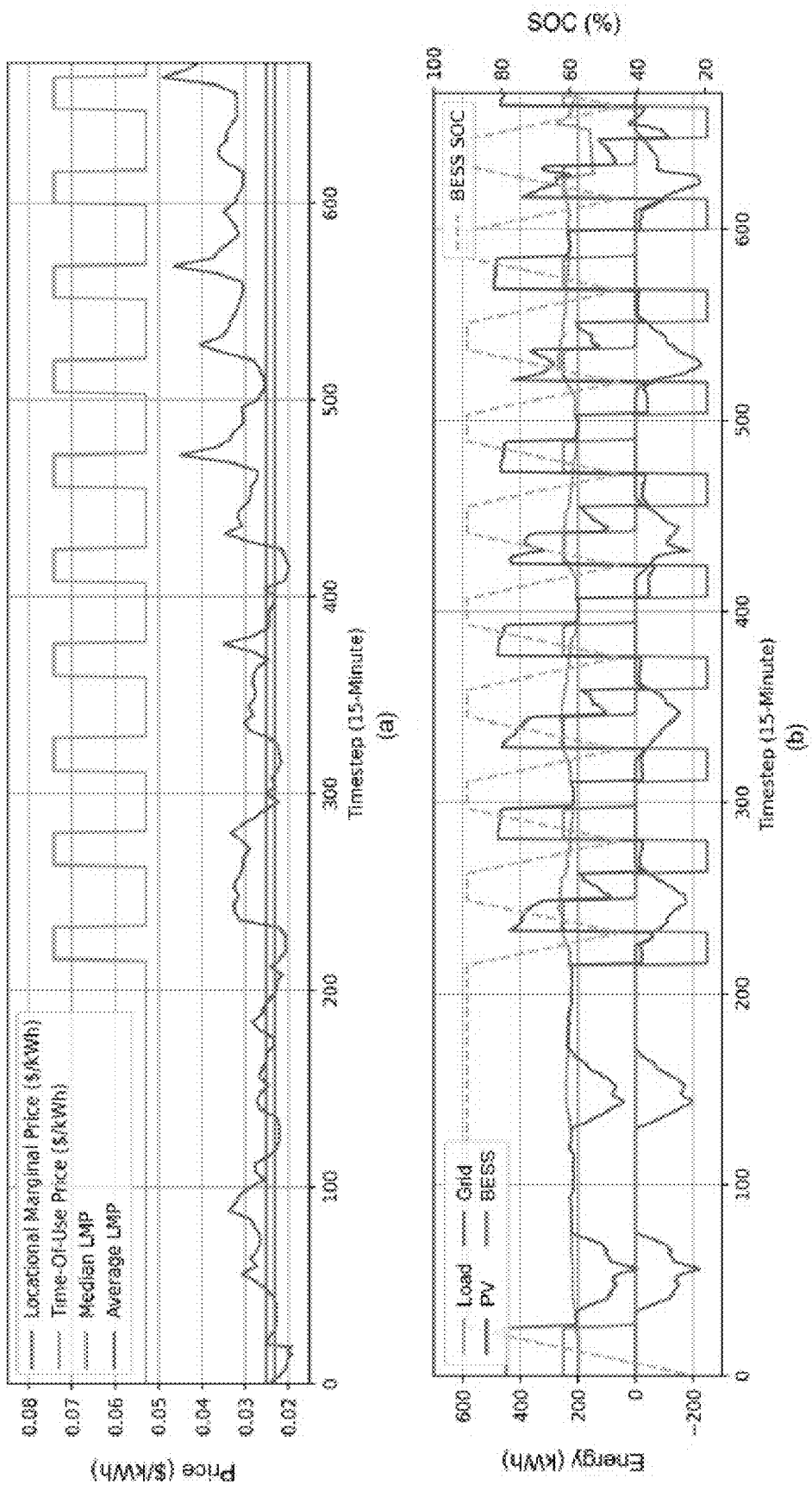
FIGS. 13(a)-13(e) show data and corresponding control results over a one-week period.
Figure 13C:
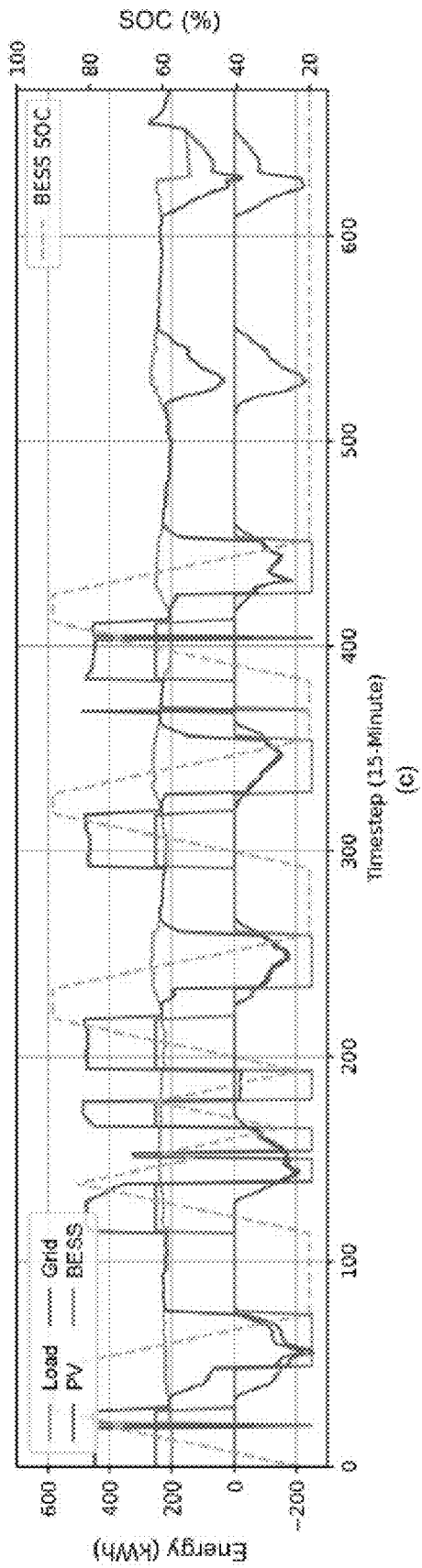
Figure 13D:
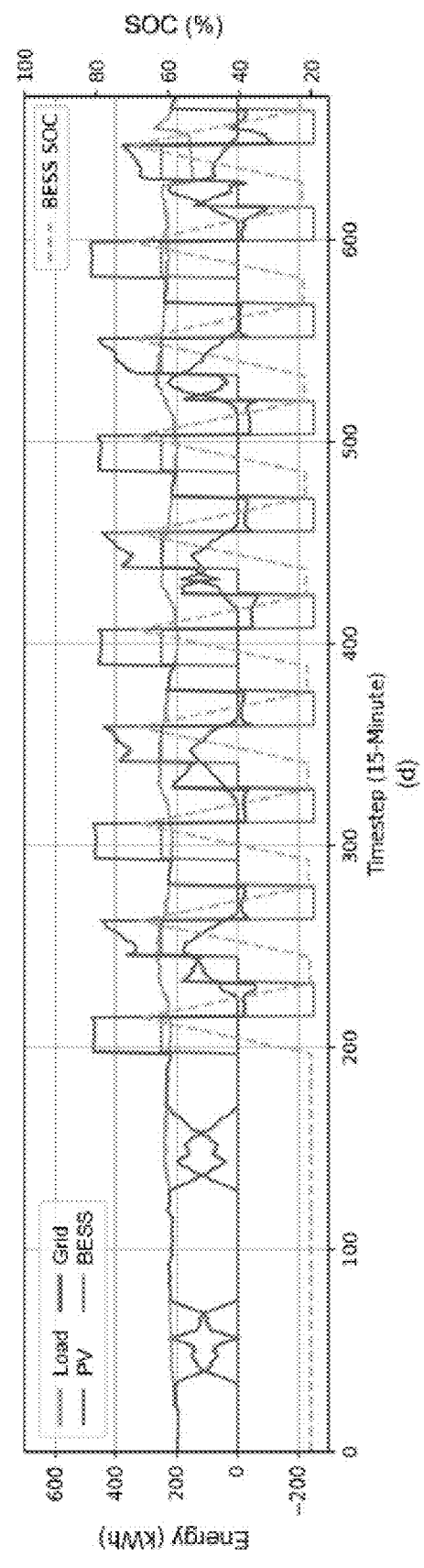
Figure 13E:
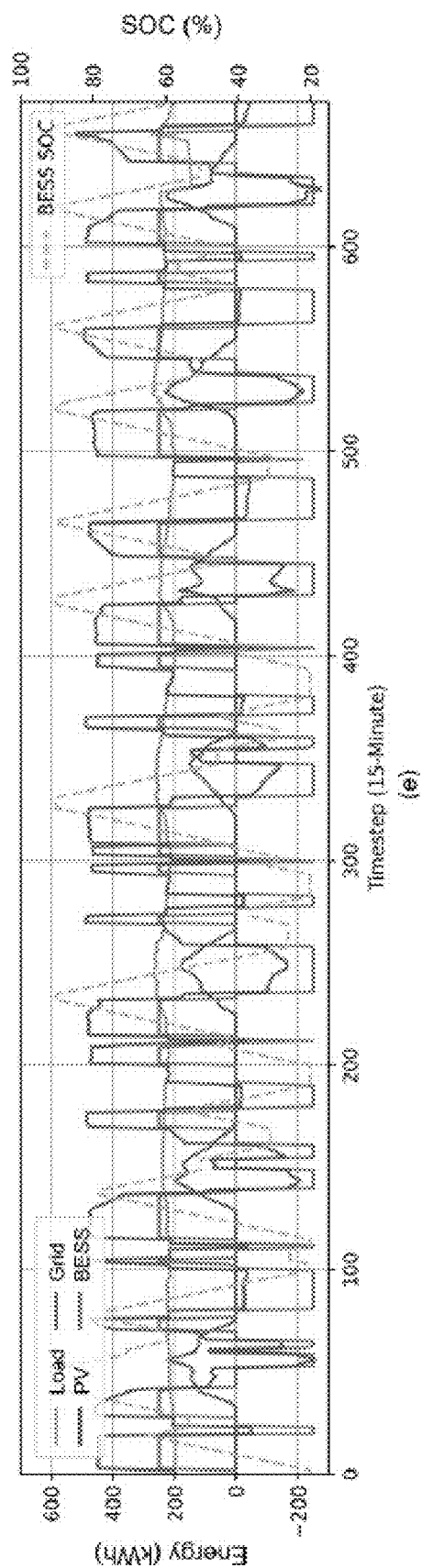

A one-week comparative analysis of TOU and LMP electricity pricing, along with the resulting power flows from load, PV generation, BESS operation, and grid interaction for both the baseline RB algorithm and the MILP-based scheduling algorithm under respective pricing regimes, is presented in FIGS. 13(a)-13(e). In FIG. 13(b), the RB algorithm demonstrates effective charge management by ensuring sufficient BESS capacity is available during on-peak periods, with charging consistently occurring during off-peak intervals. In contrast, FIG. 13(d) illustrates that the MILP-based algorithm initiates charging closer to the anticipated discharge periods, which may result in suboptimal arbitrage performance due to insufficient BESS capacity during on-peak pricing windows. Conversely, FIG. 13(c) highlights that the RB algorithm lacks the predictive capability to efficiently respond to the variability of LMP-based energy pricing, leading to ineffective deployment of the BESS and minimal economic gain. However, in the MILP-based scheduling under LMP pricing, as shown in FIG. 13(e), the BESS is scheduled proactively and strategically, with charging and discharging actions aligned with forecasted PV generation, load consumption, and grid outages, thereby optimizing economic returns through more effective energy arbitrage.

Sensitivity Analysis of Forecasting Error:

To evaluate the sensitivity of the MILP-based BESS dispatch scheduling algorithm to forecast accuracy, particularly in relation to PV generation and load demand, a one-year simulation is conducted using historical data, consistent with the initial economic assessment. In this analysis, systematic forecast bias errors ranging from −10% to +10% are introduced across 18 distinct cases. Additionally, to assess the impact of grid interconnection constraints, the maximum allowable grid export capacity is varied between 0.5 MW and 1.0 MW. Any energy exported beyond the specified export limit is classified as non-compensable and, therefore, does not contribute to revenue. This excess energy is treated as lost energy. These constraints provide insight into how inaccuracies in forecast inputs, coupled with grid export limitations, can affect the overall economic viability of the system as measured by its Levelized Cost of Energy (LCOE). The applied forecast error scenarios, corresponding annual non-compensated energy exports, calculated LCOE, and the relative reduction in LCOE for each case are presented in FIGS. 22(a)-22(b).

In both grid export constraint scenarios, as shown in FIGS. 22(a)-22(b), the economic impact is most pronounced when PV generation is underestimated, and load demand is overestimated. This is particularly evident in Case 11.3, as shown in FIG. 22(a), and Case 11.12, as shown in FIG. 22(b), where PV generation forecasts are biased −10% and load forecasts +10%. These cases result in significant annual quantities of non-revenue-generating exported energy, culminating in increased LCOE values of 0.674% and 0.183%, respectively. Such results underscore the importance of accurate short-term forecasting in maximizing the economic benefits of BESS dispatch scheduling strategies under varying operational constraints.

The results of the forecast bias error sensitivity analysis indicate that deviations in PV generation or load consumption forecasts from ideal conditions result in reduced economic performance, as evidenced by increased or, in some cases, unchanged LCOE values. This degradation in performance is primarily attributable to (i) suboptimal dispatch scheduling of the BESS and (ii) non-revenue-generating energy exports resulting from forecasting inaccuracies that cause unintentional over-generation. Under both grid export constraint scenarios, as shown in FIGS. 22(a)-22(b), the adverse impact is most pronounced when PV generation is underestimated while load consumption is overestimated. This condition is exemplified in Cases 11.3 and 11.12, where a −10% bias in PV generation forecast combined with a +10% bias in load forecast results in substantial quantities of uncompensated exported energy. Consequently, the system experiences increased LCOE values of 0.674% and 0.183%, respectively, relative to the ideal forecast scenario. These findings underscore the critical role of forecast accuracy in maintaining the economic viability of BESS dispatch scheduling strategies under constrained grid export conditions.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for the resilient artificial intelligence (AI)-based data-driven dispatch of a battery energy storage system (BESS), the system comprising:
   a processor; and
   a machine-readable medium in operable communication with the processor and having instructions stored thereon that, when executed by the processor, perform the following steps:
   a) collecting a weather forecast based on geographical coordinates of a microgrid via an Application Programming Interface (API);
   b) collecting a market forecast from available energy market data accessed via the API;
   c) retrieving internal system parameters comprising State of Charge (SOC) directly from the BESS;
   d) generating a photovoltaic (PV) generation prediction of an on-site solar canopy using collected data and a first machine learning (ML) model;
   e) generating a load consumption prediction of on-site loads using collected data and a second ML model;

f) generating a regional outage prediction of a surrounding distribution system using collected data and a third ML model;
g) calculating charge requirements to address detected outage event durations using a rule-based (RB) method;
h) determining a dispatch profile for the BESS to achieve optimal economic return using a Mixed-Integer Linear Programming (MILP)-based method;
i) transmitting recommended control setpoints based on the dispatch profile generated at a tertiary control level of a microgrid control system to a secondary control level; and
j) upon detecting an energy deficit or an energy surplus within the microgrid, effectuating energy purchase from or sale to, respectively, a main grid through a Point of Common Coupling (PCC).

2. The system according to claim 1, steps a)-j) being implemented within the microgrid, which is grid-tied and comprises PV components and components of the BESS.

3. The system according to claim 1, the microgrid operating in accordance with specifications defined in Institute of Electrical and Electronics Engineers (IEEE) Standard 2030.7-2017 to support interoperable integration, reliable performance, and efficient operation of the BESS within a utility grid infrastructure.

4. The system according to claim 1, the first ML model comprising a Support Vector Regression (SVR) model configured to process input features comprising ambient temperature, module temperature, and Plane of Array (POA) irradiance.

5. The system according to claim 1, the second ML model comprising a regression tree model configured to process input features comprising ambient temperature, a month indicator, an hour-of-day indicator, and a working day indicator specifying whether a given day is a working day.

6. The system according to claim 1, the third ML model comprising a hybrid Long Short-Term Memory (LSTM) and Convolutional Neural Network (CNN) model, the third ML model being configured to receive forecasted local weather measurements as time series data and radar imagery representing spatial weather conditions as inputs.

7. The system according to claim 1, the instructions, when executed, further performing the following step:
upon prediction of an outage, initiating a proactive islanding trigger of local loads to alert grid operators and the microgrid control system of an impending intentional islanding operation.

8. The system according to claim 1, further comprising a controller device operatively coupled to the microgrid and configured to communicate with downstream client devices, the downstream client devices comprising Programmable Logic Controllers (PLCs), the secondary control level of the microgrid control system, and one or more devices having access to operational site data relevant to operation of the controller device.

9. The system according to claim 8, the controller device being connected to a cloud-based application for remote monitoring and review and being accessible on-site for visualizing operational data and adjusting device settings.

10. The system according to claim 8, the controller device comprising:
(i) a backend server configured to execute embedded code and to communicate with user-interactive applications and backend code of the controller device;
(ii) configuration files and the first ML model, the second ML model, and the third ML model stored in the backend server;
(iii) a communication interface configured to manage data exchange with client devices via Modbus; and
(iv) a database configured to store operational parameters for visualization.

11. A method for the resilient artificial intelligence (AI)-based data-driven dispatch of a battery energy storage system (BESS), the method comprising:
a) collecting a weather forecast based on geographical coordinates of a microgrid via an Application Programming Interface (API);
b) collecting a market forecast from available energy market data accessed via the API;
c) retrieving internal system parameters comprising State of Charge (SOC) directly from the BESS;
d) generating a photovoltaic (PV) generation prediction of an on-site solar canopy using collected data and a first machine learning (ML) model;
e) generating a load consumption prediction of on-site loads using collected data and a second ML model;
f) generating a regional outage prediction of a surrounding distribution system using collected data and a third ML model;
g) calculating charge requirements to address detected outage event durations using a rule-based (RB) method;
h) determining a dispatch profile for the BESS to achieve optimal economic return using a Mixed-Integer Linear Programming (MILP)-based method;
i) transmitting recommended control setpoints based on the dispatch profile generated at a tertiary control level of a microgrid control system to a secondary control level; and
j) upon detecting an energy deficit or an energy surplus within the microgrid, effectuating energy purchase from or sale to, respectively, a main grid through a Point of Common Coupling (PCC).

12. The method according to claim 11, steps a)-j) being implemented within the microgrid, which is grid-tied and comprises PV components and components of the BESS.

13. The method according to claim 11, the microgrid operating in accordance with specifications defined in Institute of Electrical and Electronics Engineers (IEEE) Standard 2030.7-2017 to support interoperable integration, reliable performance, and efficient operation of the BESS within a utility grid infrastructure.

14. The method according to claim 11, the first ML model comprising a Support Vector Regression (SVR) model configured to process input features comprising ambient temperature, module temperature, and Plane of Array (POA) irradiance.

15. The method according to claim 11, the second ML model comprising a regression tree model configured to process input features comprising ambient temperature, a month indicator, an hour-of-day indicator, and a working day indicator specifying whether a given day is a working day.

16. The method according to claim 11, the third ML model comprising a hybrid Long Short-Term Memory (LSTM) and Convolutional Neural Network (CNN) model, the third ML model being configured to receive forecasted local weather measurements as time series data and radar imagery representing spatial weather conditions as inputs.

17. The method according to claim 11, further comprising:
upon prediction of an outage, initiating a proactive islanding trigger of local loads to alert grid operators and the microgrid control system of an impending intentional islanding operation.

18. The method according to claim 11, further comprising operatively coupling a controller device to the microgrid,
the controller device being configured to communicate with downstream client devices,
the downstream client devices comprising Programmable Logic Controllers (PLCs), the secondary control level of the microgrid control system, and one or more devices having access to operational site data relevant to operation of the controller device, and
the controller device being connected to a cloud-based application for remote monitoring and review, and being accessible on-site for visualizing operational data and adjusting device settings.

19. The method according to claim 18, the controller device comprising:
(i) a backend server configured to execute embedded code and to communicate with user-interactive applications and backend code of the controller device;
(ii) configuration files and the first ML model, the second ML model, and the third ML model stored in the backend server;
(iii) a communication interface configured to manage data exchange with client devices via Modbus; and
(iv) a database configured to store operational parameters for visualization.

20. A system for the resilient artificial intelligence (AI)-based data-driven dispatch of a battery energy storage system (BESS), the system comprising:
a processor; and
a machine-readable medium in operable communication with the processor and having instructions stored thereon that, when executed by the processor, perform the following steps:
a) collecting a weather forecast based on geographical coordinates of a microgrid via an Application Programming Interface (API);
b) collecting a market forecast from available energy market data accessed via the API;
c) retrieving internal system parameters comprising State of Charge (SOC) directly from the BESS;
d) generating a photovoltaic (PV) generation prediction of an on-site solar canopy using collected data and a first machine learning (ML) model;
e) generating a load consumption prediction of on-site loads using collected data and a second ML model;
f) generating a regional outage prediction of a surrounding distribution system using collected data and a third ML model;
g) calculating charge requirements to address detected outage event durations using a rule-based (RB) method;
h) determining a dispatch profile for the BESS to achieve optimal economic return using a Mixed-Integer Linear Programming (MILP)-based method;
i) transmitting recommended control setpoints based on the dispatch profile generated at a tertiary control level of a microgrid control system to a secondary control level; and
j) upon detecting an energy deficit or an energy surplus within the microgrid, effectuating energy purchase from or sale to, respectively, a main grid through a Point of Common Coupling (PCC),
steps a)-j) being implemented within the microgrid, which is grid-tied and comprises PV components and components of the BESS,
the microgrid operating in accordance with specifications defined in Institute of Electrical and Electronics Engineers (IEEE) Standard 2030.7-2017 to support interoperable integration, reliable performance, and efficient operation of the BESS within a utility grid infrastructure,
the first ML model comprising a Support Vector Regression (SVR) model configured to process input features comprising ambient temperature, module temperature, and Plane of Array (POA) irradiance,
the second ML model comprising a regression tree model configured to process input features comprising ambient temperature, a month indicator, an hour-of-day indicator, and a working day indicator specifying whether a given day is a working day,
the third ML model comprising a hybrid Long Short-Term Memory (LSTM) and Convolutional Neural Network (CNN) model, the third ML model being configured to receive forecasted local weather measurements as time series data and radar imagery representing spatial weather conditions as inputs,
the instructions, when executed, further performing the following step:
upon prediction of an outage, initiating a proactive islanding trigger of local loads to alert grid operators and the microgrid control system of an impending intentional islanding operation,
the system further comprising a controller device operatively coupled to the microgrid and configured to communicate with downstream client devices,
the downstream client devices comprising Programmable Logic Controllers (PLCs), the secondary control level of the microgrid control system, and one or more devices having access to operational site data relevant to operation of the controller device,
the controller device being connected to a cloud-based application for remote monitoring and review, and being accessible on-site for visualizing operational data and adjusting device settings, and
the controller device comprising:
(i) a backend server configured to execute embedded code and to communicate with user-interactive applications and backend code of the controller device;
(ii) configuration files and the first ML model, the second ML model, and the third ML model stored in the backend server;
(iii) a communication interface configured to manage data exchange with client devices via Modbus; and
(iv) a database configured to store operational parameters for visualization.

* * * * *